(12) United States Patent
Elberbaum

(10) Patent No.: US 9,608,418 B1
(45) Date of Patent: Mar. 28, 2017

(54) DECORATIVE COVERS AND KEYS FOR ELECTRICAL WIRING DEVICES

(71) Applicant: Elbex Video Ltd., Tokyo (JP)

(72) Inventor: David Elberbaum, Tokyo (JP)

(73) Assignee: ELBEX VIDEO LTD., Tokyo (JP)

( * ) Notice: Subject to any disclaimer, the term of this patent is extended or adjusted under 35 U.S.C. 154(b) by 0 days.

(21) Appl. No.: 15/073,081

(22) Filed: Mar. 17, 2016

(51) Int. Cl.
*H02G 3/14* (2006.01)
*H02G 3/08* (2006.01)
*H02G 3/12* (2006.01)

(52) U.S. Cl.
CPC .............. *H02G 3/083* (2013.01); *H02G 3/12* (2013.01)

(58) Field of Classification Search
CPC .......... H02G 3/083; H02G 3/081; H02G 3/12; H02G 3/14; H02G 3/08; H01R 13/5213; H01R 13/46; H05K 5/03; H05K 5/00
USPC ............... 174/66, 67, 50, 520, 53, 480, 481; 220/241, 242, 3.2–3.9, 4.02; 439/535, 439/536
See application file for complete search history.

(56) References Cited

U.S. PATENT DOCUMENTS

| | | | | |
|---|---|---|---|---|
| 5,041,698 A | * | 8/1991 | Takagi | .................... H02G 3/18 174/66 |
| 5,455,388 A | * | 10/1995 | Pratt | ..................... H02G 3/185 174/67 |
| 6,765,149 B1 | * | 7/2004 | Ku | ........................... H02G 3/14 174/66 |
| 7,639,907 B2 | | 12/2009 | Elberbaum | |
| 7,649,727 B2 | | 1/2010 | Elberbaum | |
| 7,864,500 B2 | | 1/2011 | Elberbaum | |
| 7,939,756 B2 | * | 5/2011 | Daniels | .................... H02G 3/14 174/66 |
| 7,973,647 B2 | | 7/2011 | Elberbaum | |
| 8,041,221 B2 | | 10/2011 | Elberbaum | |
| 8,148,921 B2 | | 4/2012 | Elberbaum | |
| 8,170,722 B1 | | 5/2012 | Elberbaum | |
| 8,175,463 B2 | | 5/2012 | Elberbaum | |
| 8,269,376 B1 | | 9/2012 | Elberbaum | |
| 8,331,794 B2 | | 12/2012 | Elberbaum | |
| 8,331,795 B2 | | 12/2012 | Elberbaum | |
| 8,340,527 B2 | | 12/2012 | Elberbaum | |
| 8,344,668 B2 | | 1/2013 | Elberbaum | |
| 8,384,249 B2 | | 2/2013 | Elberbaum | |
| 8,441,824 B2 | | 5/2013 | Elberbaum | |
| 8,442,792 B1 | | 5/2013 | Elberbaum | |
| 8,594,965 B1 | | 11/2013 | Elberbaum | |
| 8,638,087 B2 | | 1/2014 | Elberbaum | |
| 8,639,465 B1 | | 1/2014 | Elberbaum | |
| 8,742,892 B1 | | 6/2014 | Elberbaum | |
| 8,930,158 B2 | | 1/2015 | Elberbaum | |
| 9,018,803 B1 | | 4/2015 | Elberbaum | |
| 9,036,158 B2 | | 5/2015 | Pesach | |

(Continued)

*Primary Examiner* — Angel R Estrada
(74) *Attorney, Agent, or Firm* — Katten Muchin Rosenman LLP

(57) ABSTRACT

A flat decorative frame made of rectangular crystal or glass or molded transparent or tinted plastic materials for providing assembly of right angle architectural decorative cover with right angle rectangular or square opening access for power outlet and push keys operating electrical hybrid or manual switches by tactile action of a tactile spring including a matching decorative touch icons panel with the panels and the keys including indicators indicating the load status and the keying position for the manual and hybrid switches.

20 Claims, 17 Drawing Sheets

(56) References Cited

U.S. PATENT DOCUMENTS

| | | |
|---|---|---|
| 9,036,320 B1 | 5/2015 | Elberbaum |
| 9,036,508 B2 | 5/2015 | Ahmad |
| 9,218,358 B2 | 12/2015 | Shaban Hussein |
| 9,219,358 B2 | 12/2015 | Elberbaum |
| 9,257,251 B2 | 2/2016 | Elberbaum |
| 9,281,147 B2 | 3/2016 | Elberbaum |

* cited by examiner

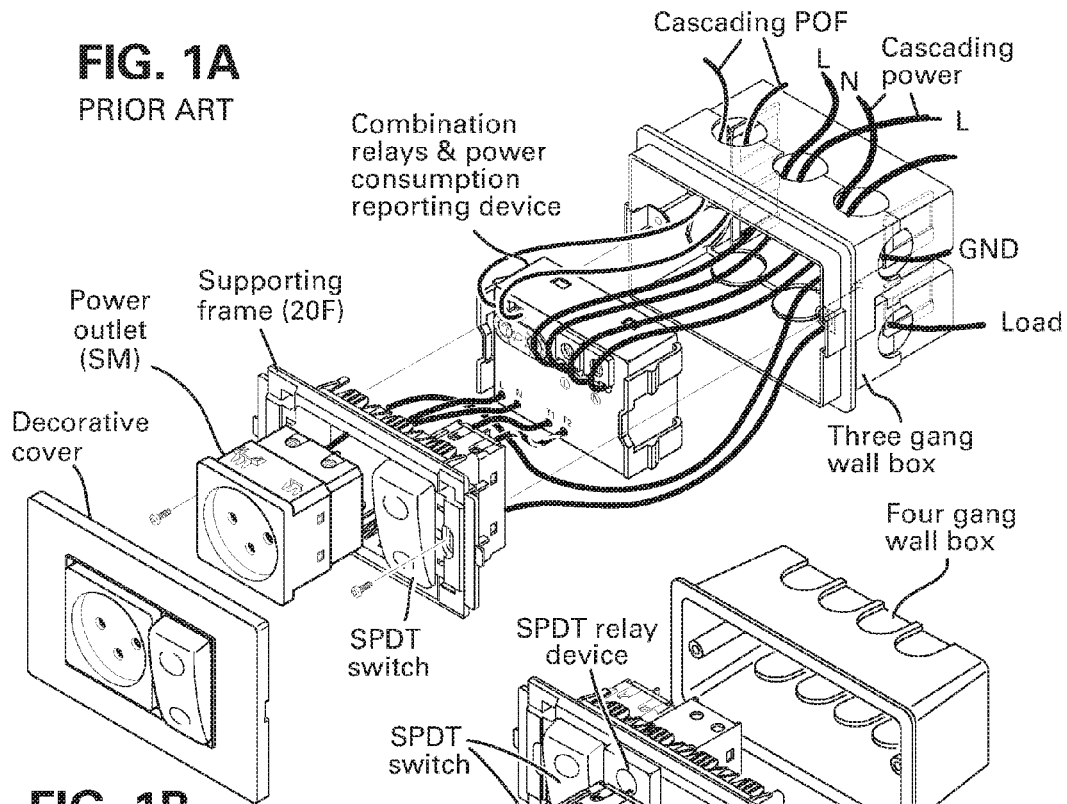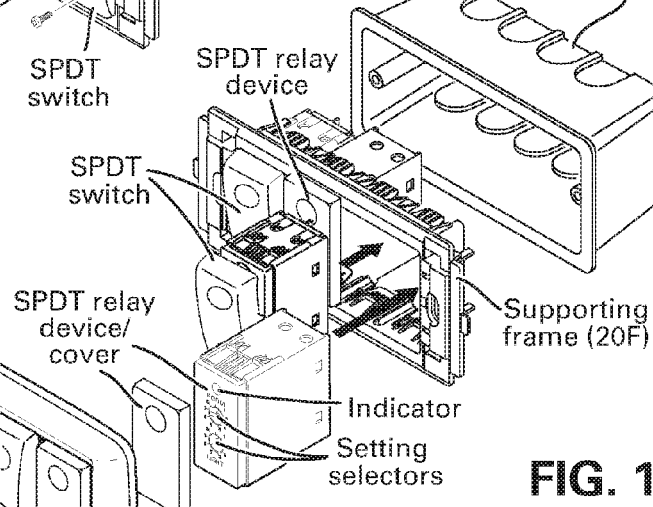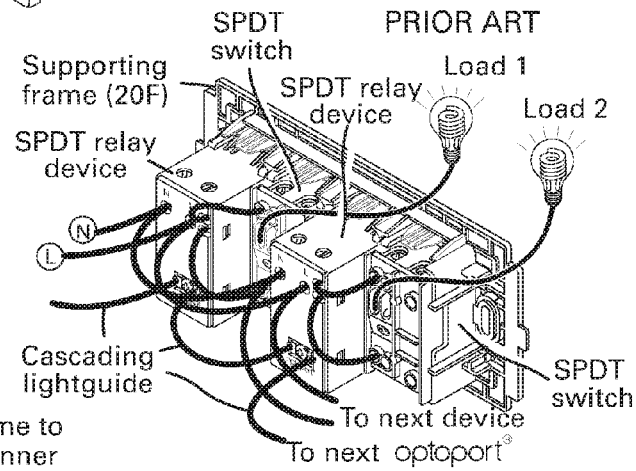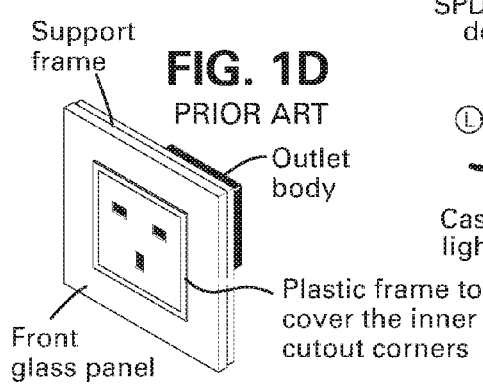

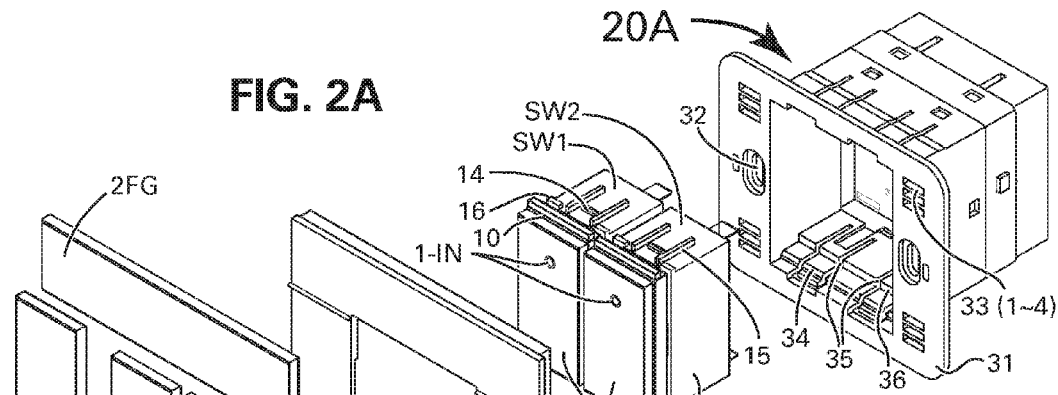
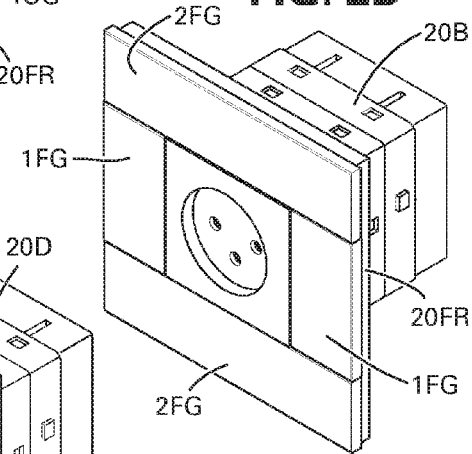
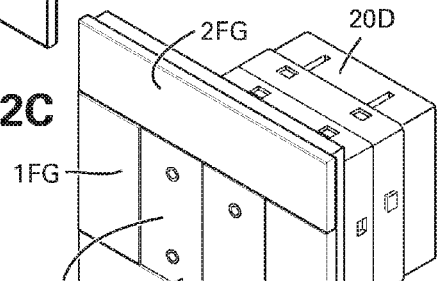
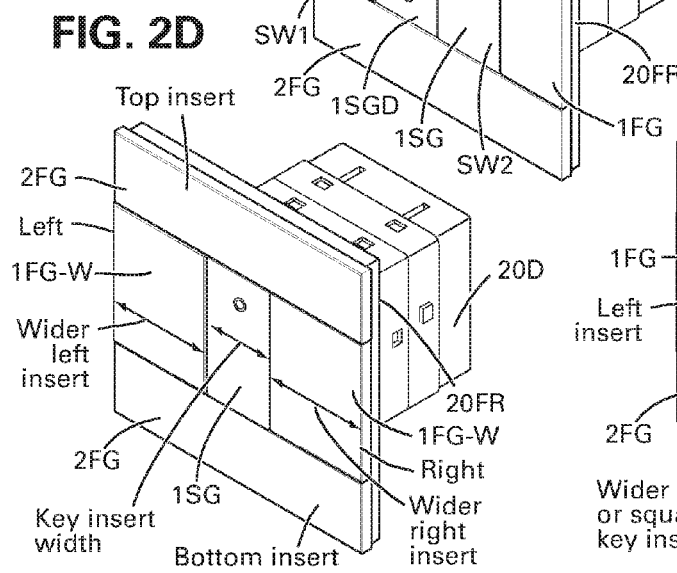
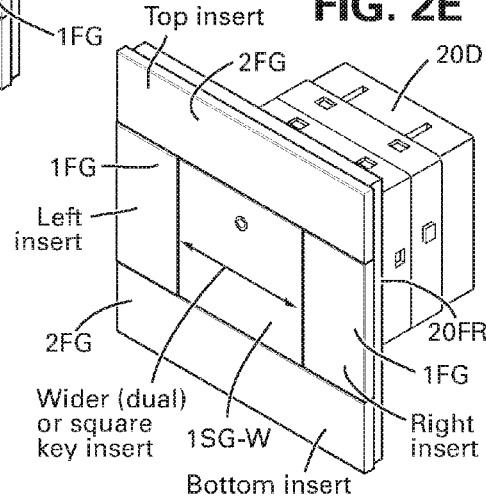

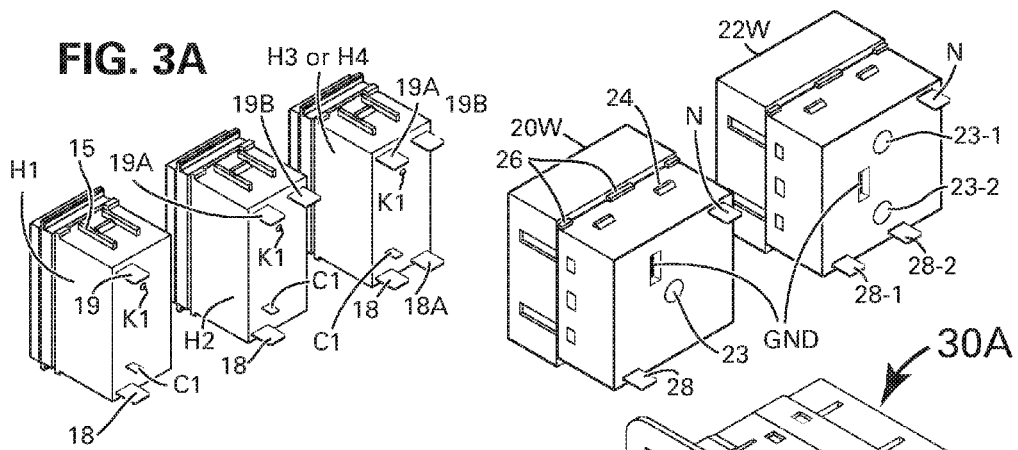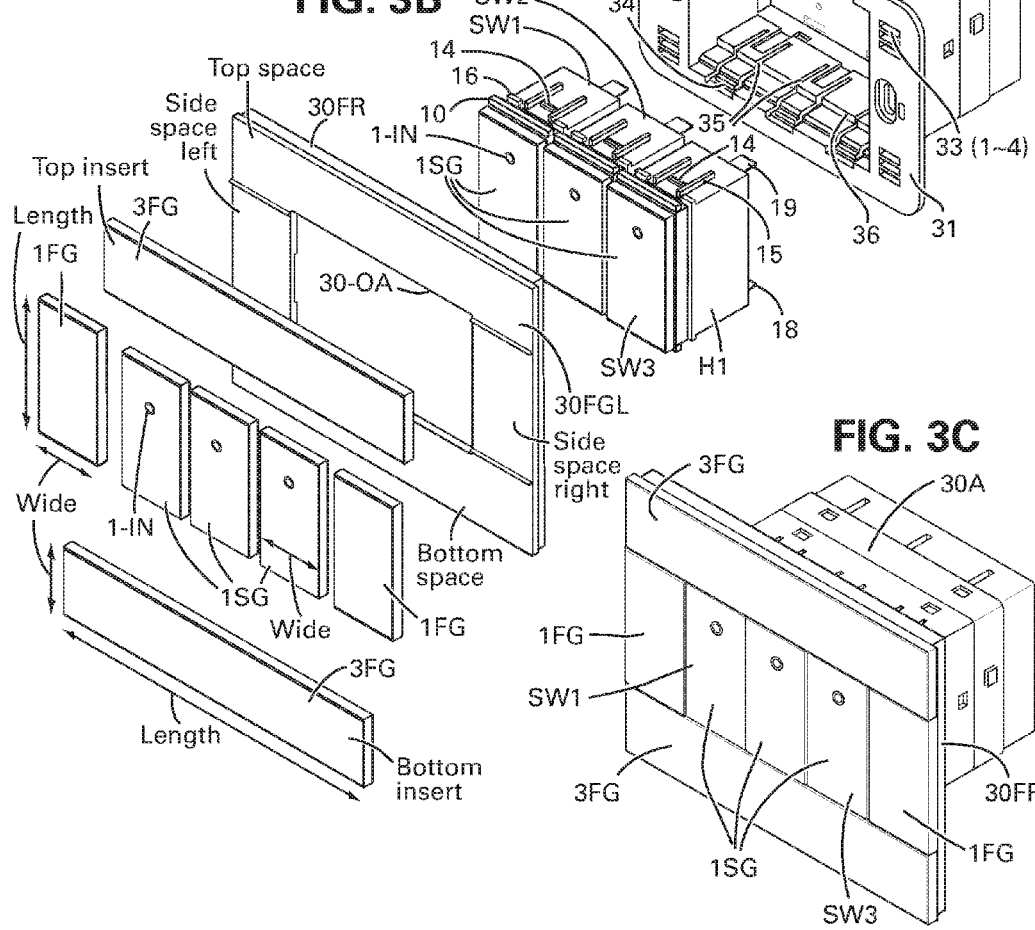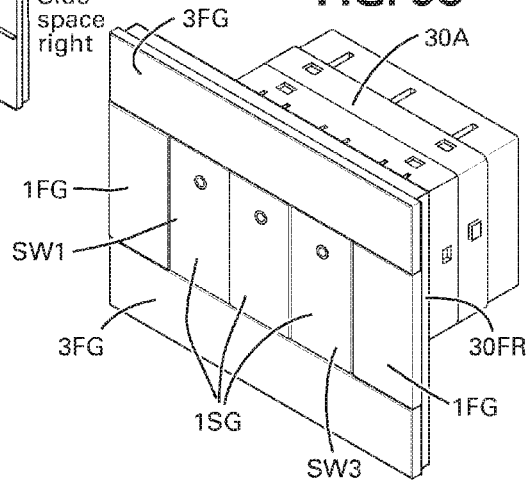

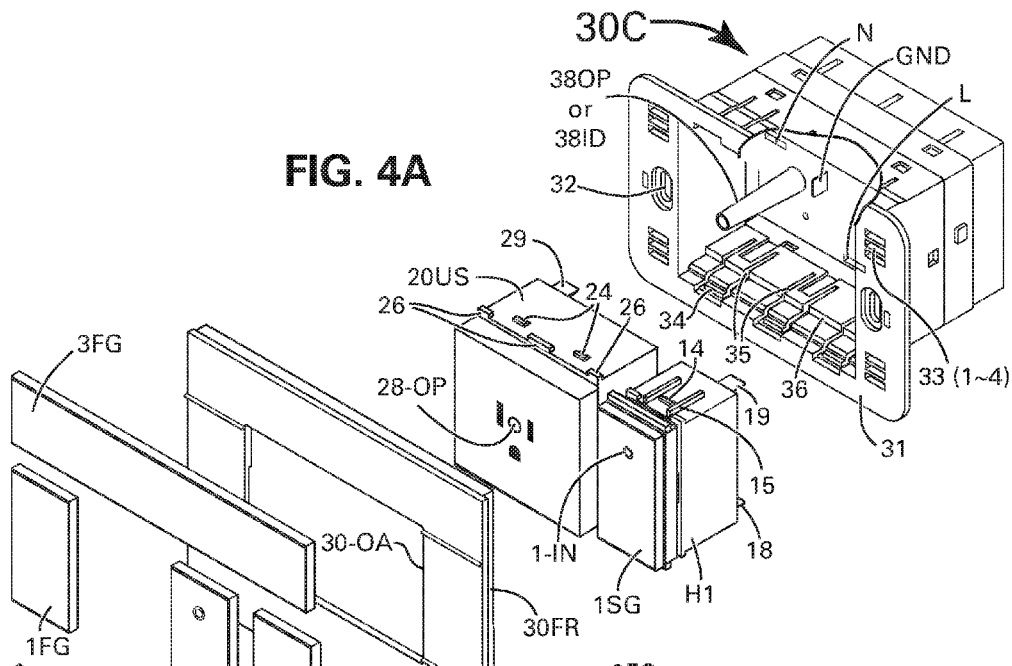
FIG. 4A
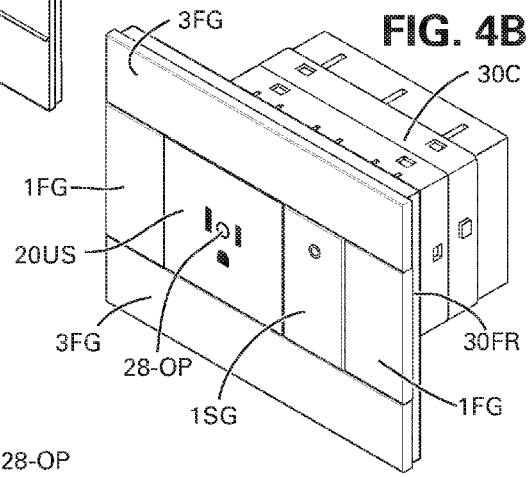
FIG. 4B
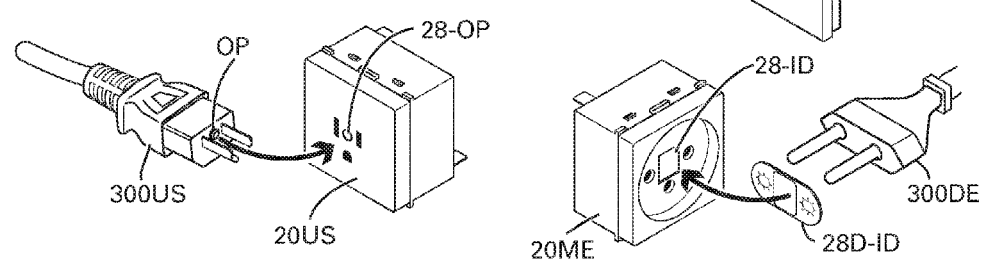
FIG. 4C
FIG. 4D

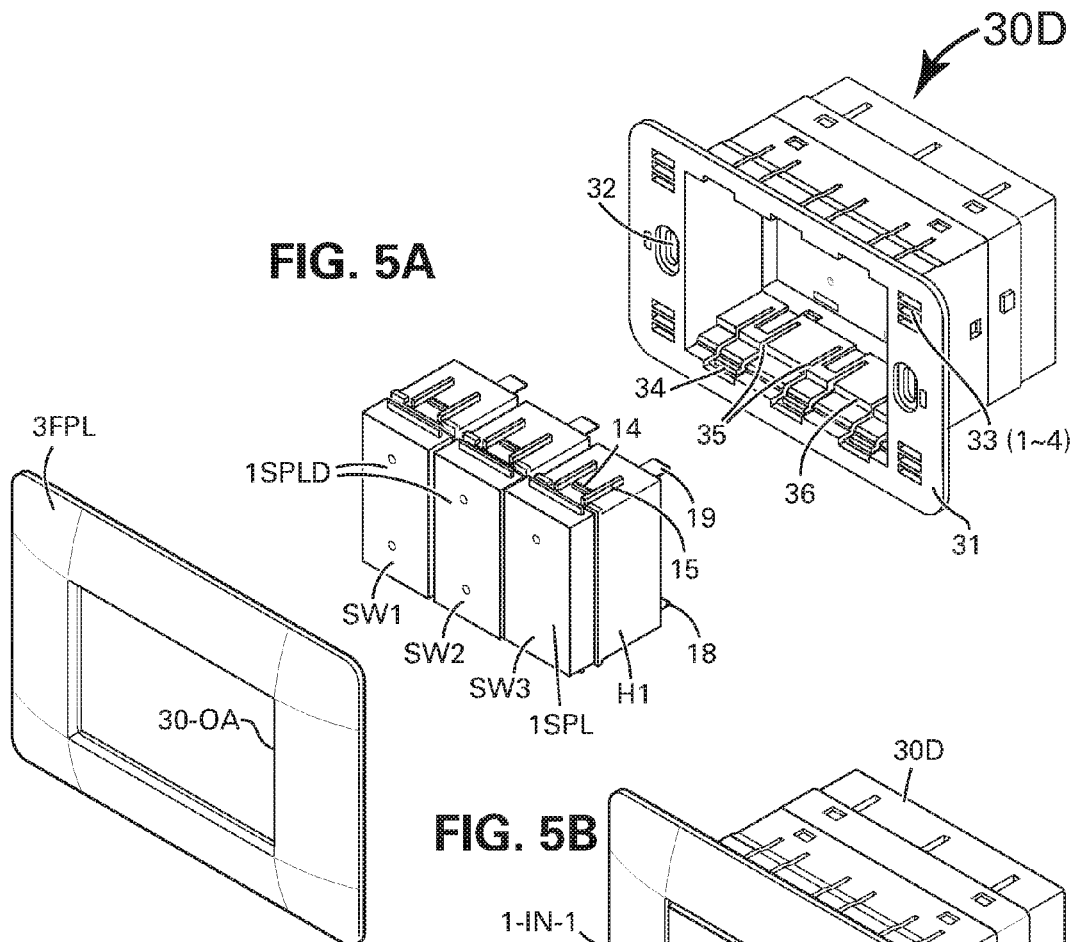
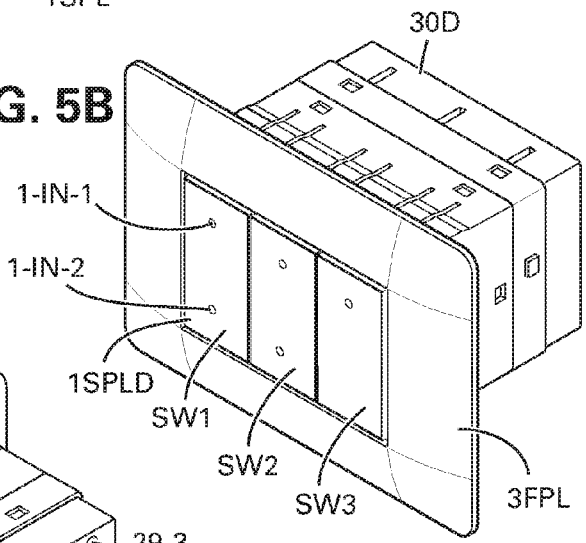
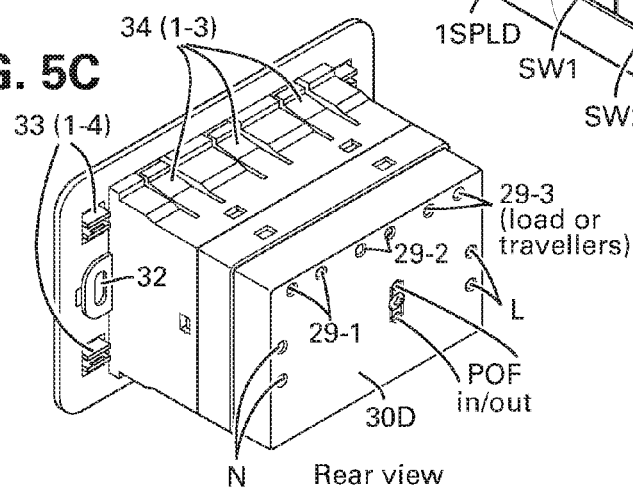

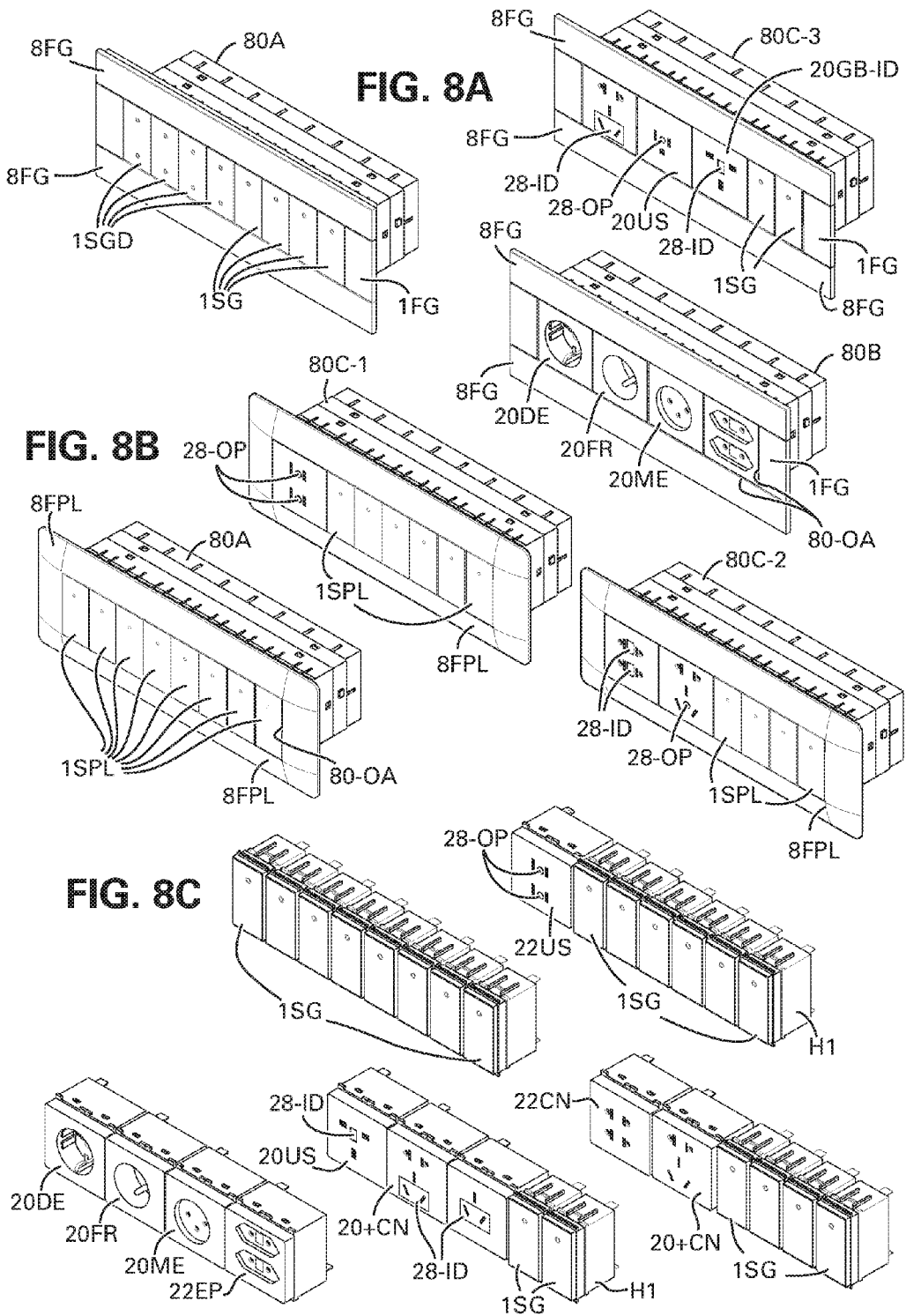

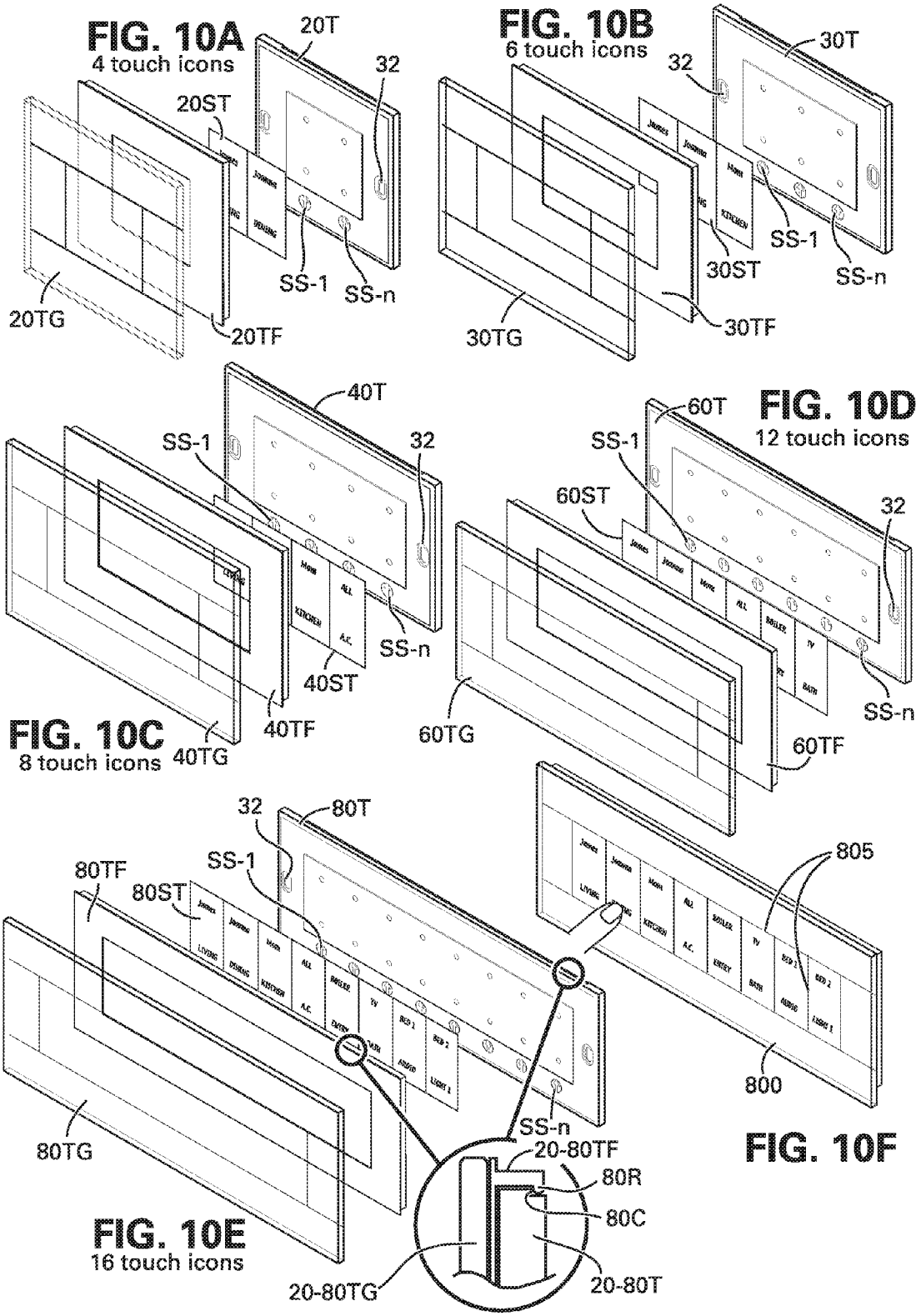

FIG. 11A
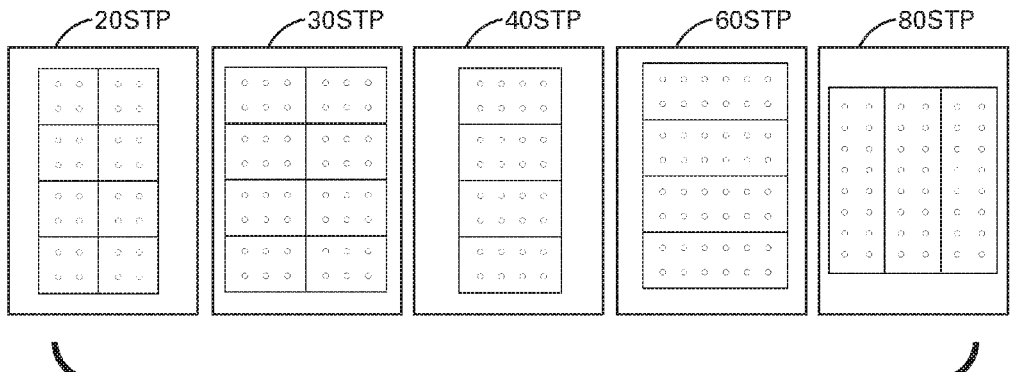
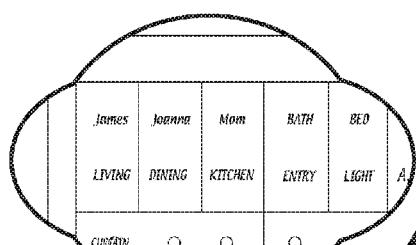
FIG. 11B
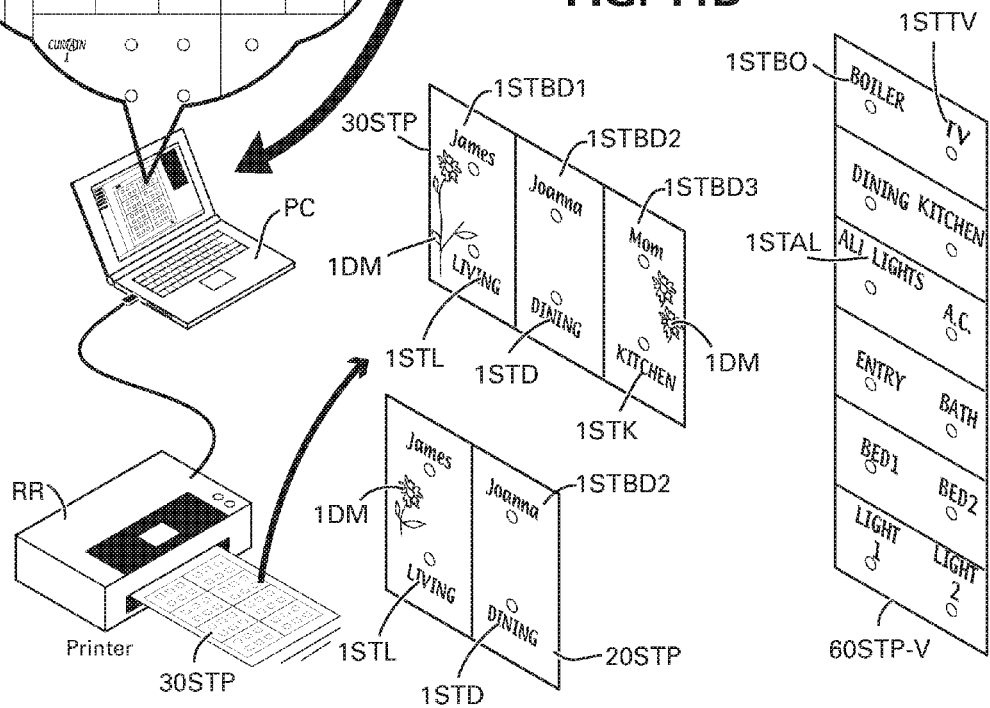

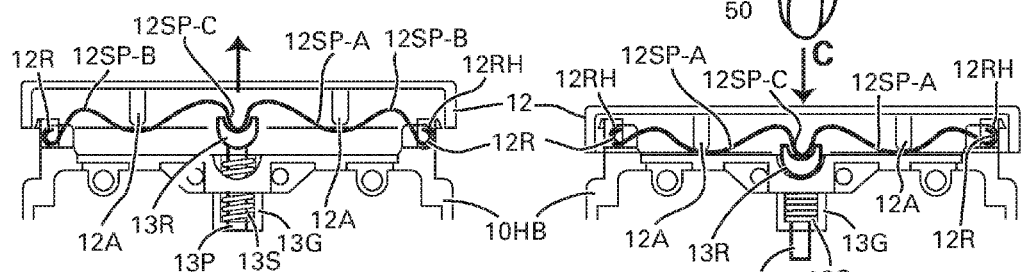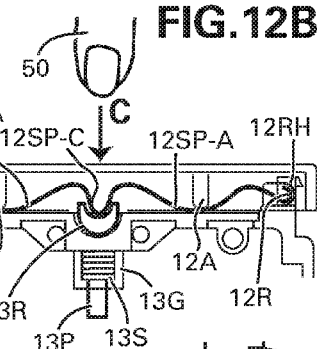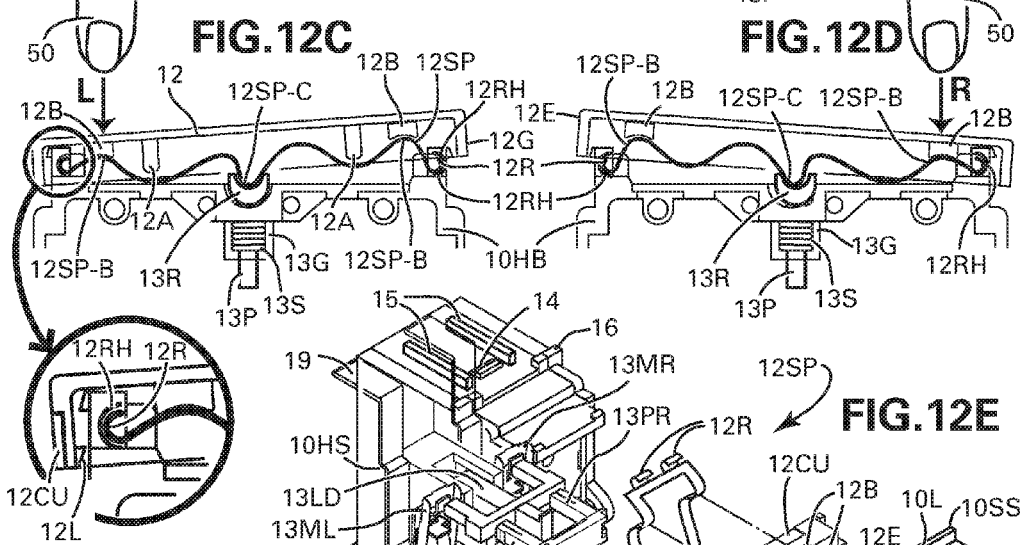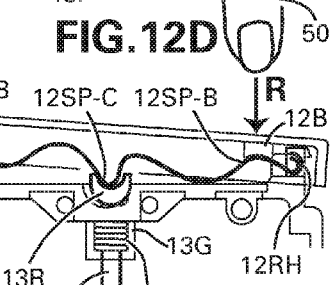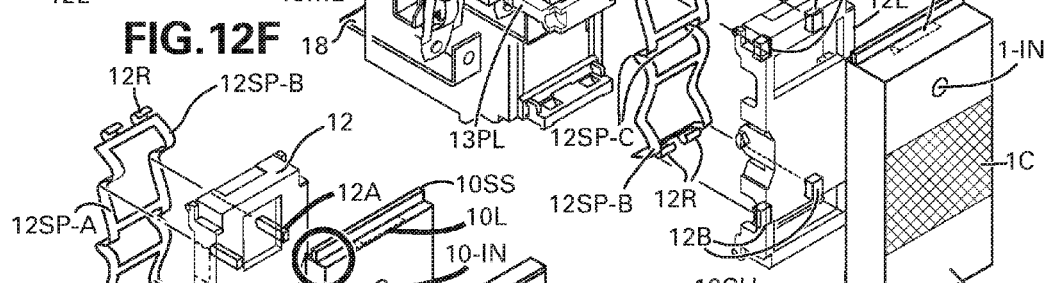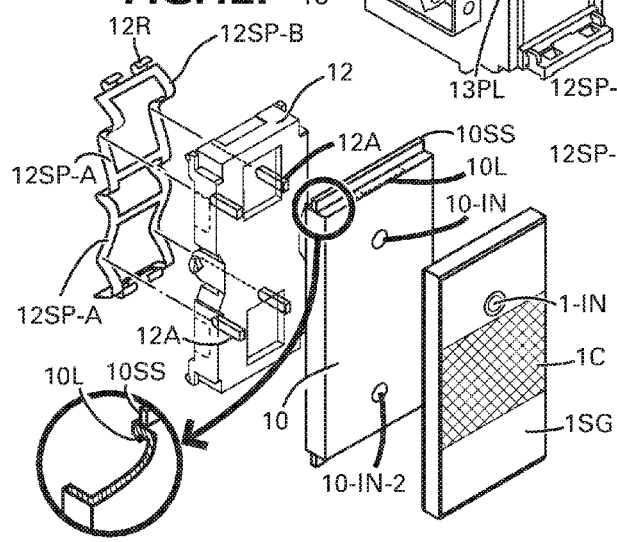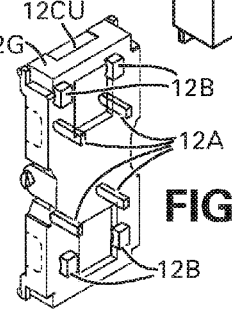

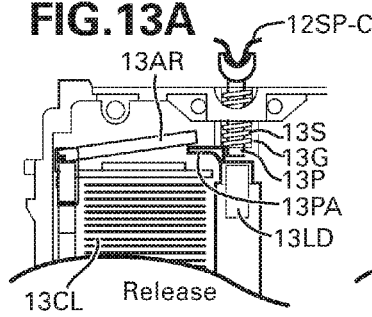
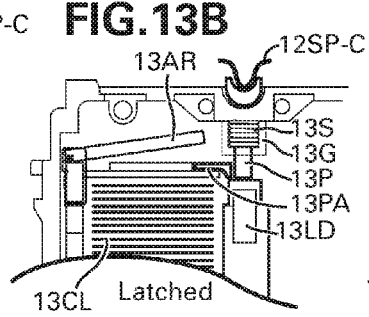
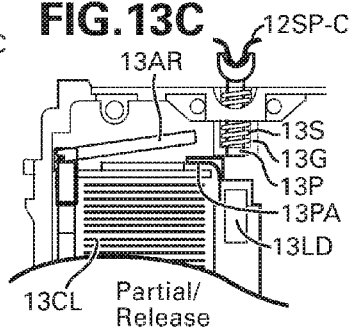
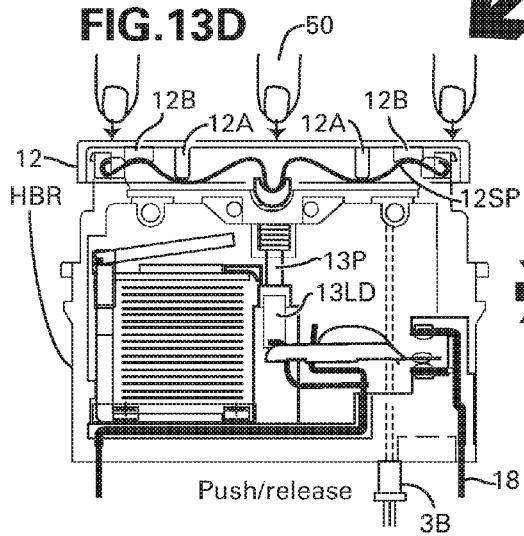
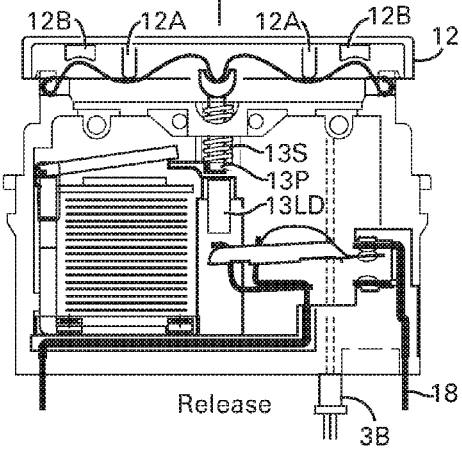
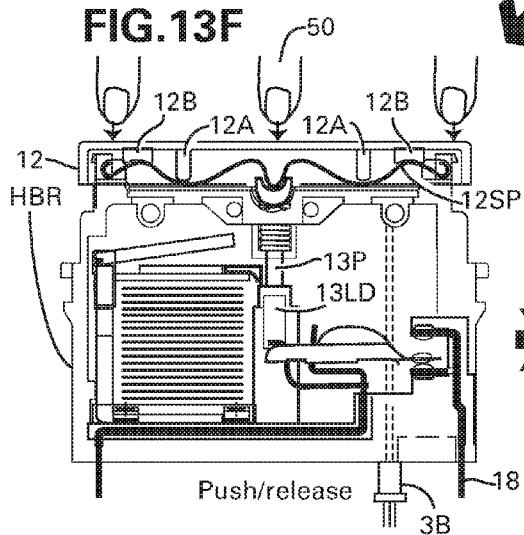
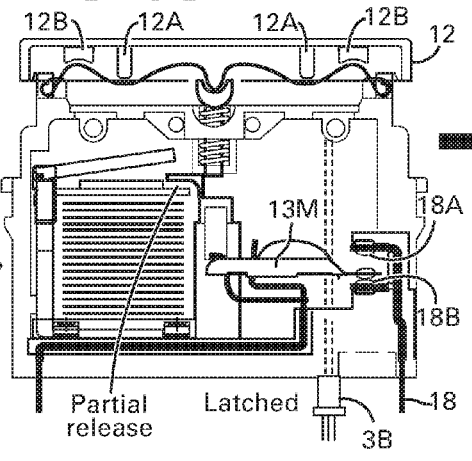

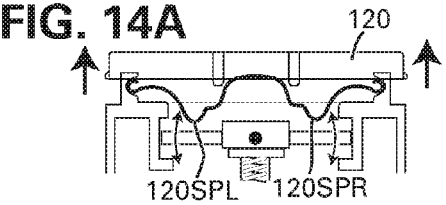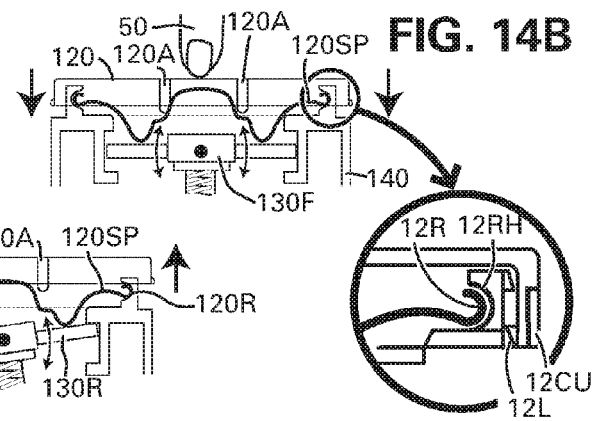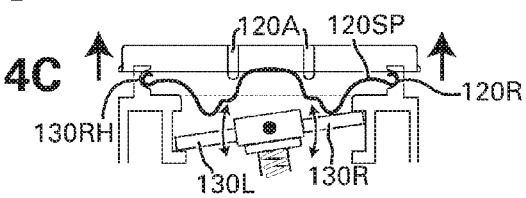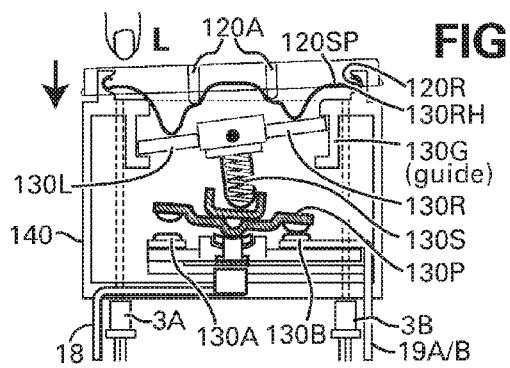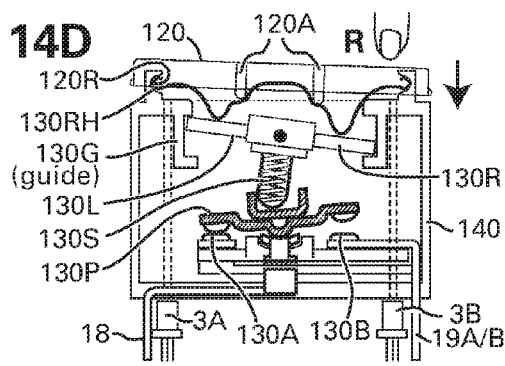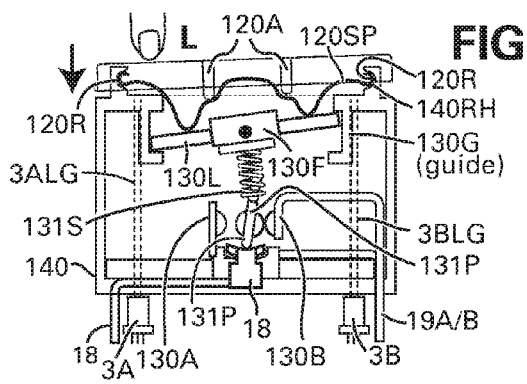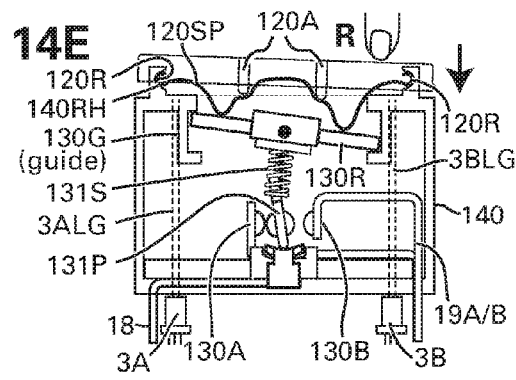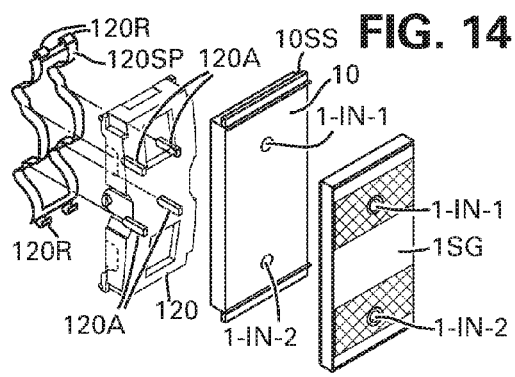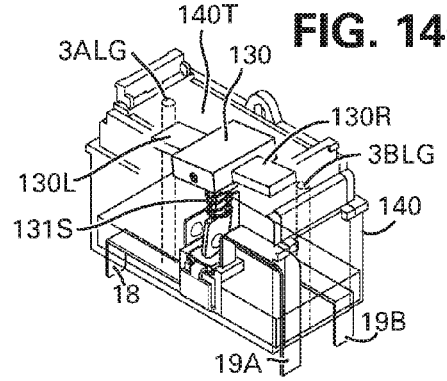

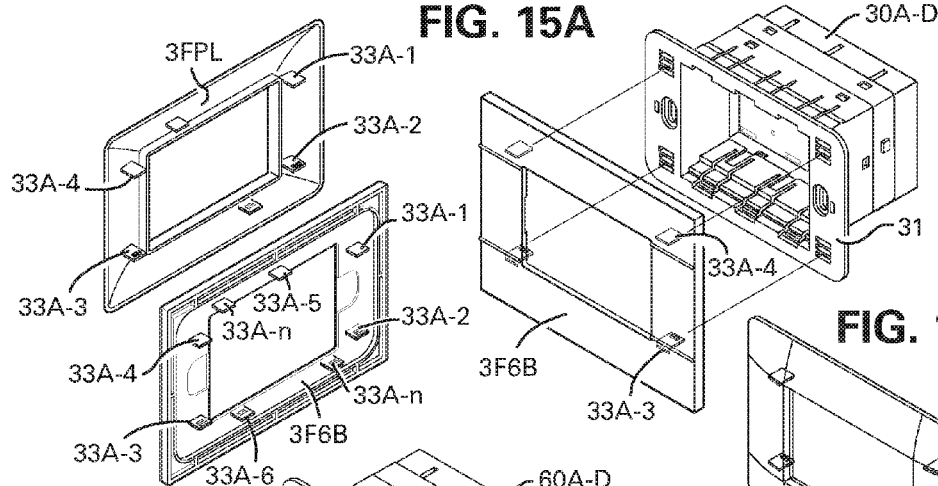
FIG. 15A
FIG. 15B
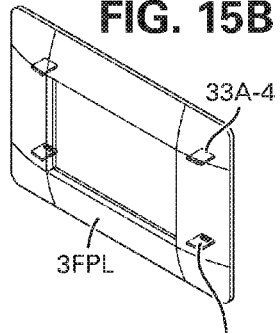
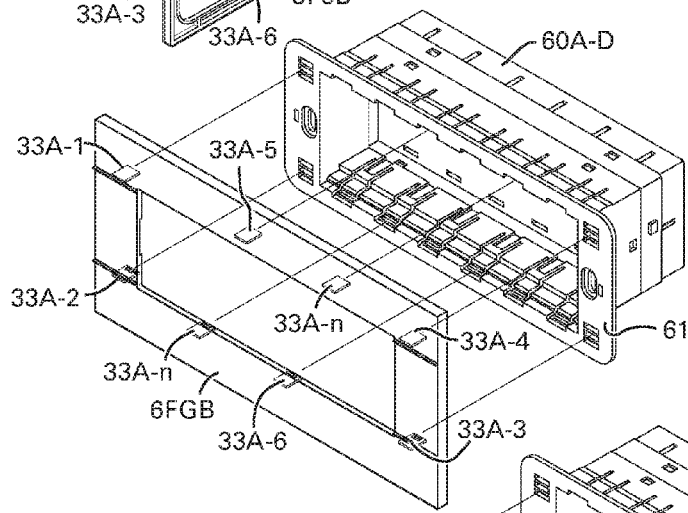
FIG. 15C
FIG. 15D
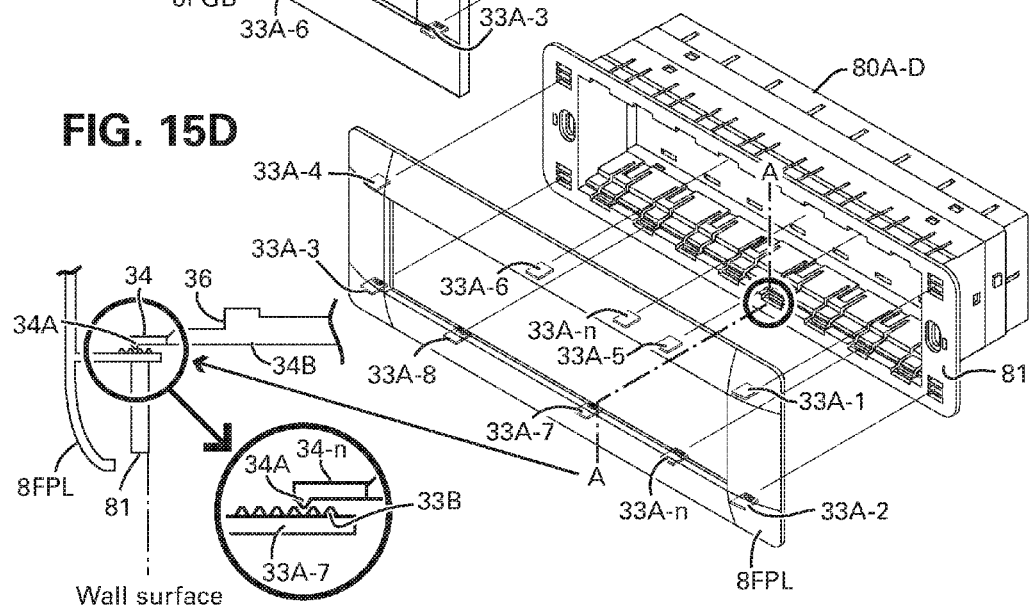

DECORATIVE COVERS AND KEYS FOR ELECTRICAL WIRING DEVICES

BACKGROUND OF THE INVENTION

1. Field of the Invention

This invention is related to decorating plates covering wall mounted electrical boxes supporting wiring devices including switches, relays and AC outlets including the switches operating keys.

2. Description of the Prior Art

Decorating plates or frames surrounding the switches, relays and AC outlets including decorative keys that are used for switching on-off electrical appliances such as lights, water boiler, air conditioners, heaters and any other electrical equipment and appliances in residences, offices, public building, businesses, hotels, restaurants and the like are very well known. The well known decorative plates, panels, frames and key covers are injected by varying plastic materials in different colors, shapes and sizes. Such decorative finishing are inexpensive, with most of the known covers and keys are known to be injected in white or off-white color, such as light beige but are also available in different hue or tints.

Other known decorative covers combine tinted glass frames in combination with plastic injected base keys. Such combined glass covers or frames with plastic injected keys are costly and rarely used in newly built building mainly because of costs.

The architects do prefer to use such decorative glass cover, but give-in because of budget overruns and other pricing constraint.

The major reason for the higher cost is the processing cost of cutting and polishing the side surfaces of commonly provided square or rectangular shape of the glass or crystal frame, but mostly the higher cost is in the cutting of the inner square or rectangular opening for each or combinations of AC outlet and switch keys.

The inner cutting or opening is processed by a rotating diamond grinder, controlled by X-Y table movement, but the four corners of the inner cut remain rounded, depending on the diameter of the grinder. Attempts to cut precision straight square corners known as right angle are literally impossible or will be extremely expensive, by using extremely thin grinder or cutting via multi steps with rotating blades.

The sharp right angle corners are needed for the esthetics and this is solved by an introduction of a decorative thin plastic frames molded to provide adequate 90° edges and corners to the cut opening with rounded inner corners. The injected square or rectangular frames are decoratively surrounding the outlets and each individual key, but are bulging and deface the flat surface of the cover. This creates an architectural problem.

Electrical grids and wiring devices for home or business premises are differently structured from automated control, wherein the electrical power via manual control (switches) is fed via the commonly installed switches in the electrical wall boxes, the home automation power is fed through relays mounted in the electrical cabinets. The change from the wall boxes to the electrical cabinets is due to the rigid rules, laws and building codes that prohibit the introduction of low voltage control wires into the wall boxes containing AC wiring devices and/or AC wires.

The electric feed from a main or sub electrical cabinet via automation relays require control panels or keys to operate or engage the relays in the cabinets. The automation relays are operated by a low voltage DC power and are controlled via bus line. This creates a state in which the commonly used standard switches are replaced by control keys, propagating control signals including RF signals or optical signals, and wherein the known toggle or rocker keys are replaced by touch panels, touch pads or key pads.

This is fundamental basic change in the structured electrical systems that involves decoration issues. Touch panels and key pads are known to be flat throughout with some are using flat glass plates for the touch pads. Such designed glass pads are a problem for homogenous finishing and color matching, wherein even if the pads sizes can be made equal to the frame size of the standard wiring devices, the architectural finishing will not be pleasing.

It would be meaningful advantage to provide lower cost glass decorating panels and keys that can be made common in size, color and shape and include manual switches, hybrid switches, power outlets, touch pads, key pads all in a matching flat surfaces, a novel architectural and electrical wiring devices in pleasing combinations.

The U.S. Pat. No. 7,649,727 introduced a new concept whereby single pole dual throw (SPDT) relay connected to a commonly used SPDT switch or dual poles dual throw (DPDT) switch enabling to switch the electrical appliances or lights manually via the commonly installed switch and remotely via the home automation controller. The SPDT and DPDT switches are known also as two way or four way switch respectively.

Further, the U.S. Pat. Nos. 7,639,907, 7,864,500, 7,973,647, 8,041,221, 8,148,921, 8,170,722, 8,175,463, 8,269,376, 8,331,794, 8,331,795, 8,340,527, 8,344,668, 8,384,249, 8,441,824, 8,442,792, 8,742,892, 8,930,158, 9,018,803, 9,036,158, 9,219,358, 9,257,251 and 9,281,147 disclose home automation controls, connections, switches and relays and accessories for operating electrical appliance via add-on devices such as the SPDT and DPDT relays or current drain sensors, RFID tags for identifying the load and operating appliances via hybrid switches including hybrid switches operated via mechanically latching relays.

The referenced U.S. Pat. Nos. 8,742,892, 8,930,158, 9,018,803, 9,036,158, 9,219,358, 9,257,251 and 9,281,147 further disclose touch screen, push switches, AC outlets and intelligent wall boxes for supporting the above switches and power outlets. The switches, keys, push, rocker or toggle and the entire assembly including the AC outlets are well known to be attached by mechanical locks and/or by screws and are covered by a decorative frame, with the keys of the switches protruding through the central opening and are operated by push or toggle or rocker action.

The above listed US patents and many pending applications in other countries disclose an add on or a combination of switches and/or power sockets, which all teach substantially advanced residence and other building automation. But little is disclosed or teach a given structure or method for providing low cost decorating panels and keys made out of glass or crystals, or made by other decorative flat molded panels and there is a need for an architectural improved panels, frames and the operating keys to be more contemporary appealing within the interiors of premises.

SUMMARY OF INVENTION

The main object of the present invention therefore is to provide decorative keys, panels and frames made of clear or tinted sheet glass or crystal or molded using tinted transparent glass resembling plastic materials including the molding of keys for manual switches, hybrid switches, integrated switch relay and the molding of AC outlets and sockets to be of same tint or color of the keys. The term "outlet" including low voltage/communication sockets and connectors each constructed to be an "attachable device" in a size matching, or smaller than the currently used mechanical AC switch or AC outlet, known to be and referred to hereafter as a "standard AC switch or outlet".

The known standard switches are mounted into "a standard electrical wall box", such as the known 2×4" or 4×4" wall boxes in the US, or such as 60 mm round European electrical wall box or other square or rectangular electrical boxes as used in Europe, Australia or China, or the establishment of new sizes and structures for installing one of plurality of given AC switches and AC outlet/sockets.

The decorating panels are preferably further including decorating covers for communication connectors such as the known RJ-45 connectors for connecting routers, printers and other PC peripherals and/or for connecting other low voltage devices connected via audio connectors, antennas or dish antennas and similar. Thereby unifying the finishing and colors of all "wiring devices" be it AC power, PC and peripherals, audio, TV and combinations thereof within premises.

The term "outlet" refers to hereafter and in the claims to AC or DC power outlets, PC and peripheral connectors, telephone connectors, audio connectors, TV antenna and cable TV connectors and other connectors used for connecting appliances to a given wall mounted sockets and plugs.

The terms "flat outlet surface" refers to an outlet having a square or rectangular front surface aligned with the entire flat panel or frame surface.

Another important practical object of the present invention is to provide lower cost decorative panels, frames and key covers to a given hybrid switches and power outlets installed into given intelligent support box disclosed in U.S. Pat. No. 9,219,358.

The term "hybrid switch" refers to hereafter and in the claims to one of relay/switch combination and mechanical latching relays used for electrical automation system disclosed in the referenced US patents, including the touch panels as disclosed in U.S. Pat. No. 8,742,892 to be in identical clear and tinted panels, be it tinted glass or plastic transparent materials or transparent material with silk printing and other painted surfaces of the otherwise clear transparent material, with particular attention given to glass and crystal glass sheets cut to right angle square or rectangular into sizes fit to a bonding surfaces and the key base surfaces.

The terms decorative insert or inserts hereafter and in the claims refer to the cut or molded right angle decorative rectangular glass or crystal sheet and or inserts molded using plastic materials such as clear or tinted acryl or polycarbonate materials.

Another objective attained by the present invention is to provide the hybrid switch with a structure that can be fitted with different key levers such as flat push and flat rocker key and the freedom to select any from a wide variety of levers and decorative covers and frames sizes including variety of design and colors that are available and are being regularly introduced to the construction/electrical industry by the different switches manufacturers.

Accordingly the terms "flat key or keys" or "flat push key or keys" refers to hereafter and in the claims to a flat keys of an hybrid switch operated by a push throughout the key surface and to flat key or keys of a manual toggle or rocker switch operated by a push of a designated/indicated area of the push key.

The term rounded key or keys refer to a molded key structure having rounded surface that fits the rounding of the surrounding molded frame esthetically.

The esthetically is emphasized to state that the rounding is an esthetic item and not dimensional.

Hence, the present invention provides to significantly upgrade the decoration plate of the intelligent support box and solves the difficulties experienced to match such wide range of available AC switch designs, AC outlets design, their panel colors and decorations by a clean contemporary flat plates designs.

Three types of switches for AC appliances and light fixture are commonly used; a single pole-single throw (SPST) and a single pole-double throw (SPDT) switch. The SPST switch is a basic on-off switch and the SPDT is a change over switch known also as two way switch. The SPDT switches are used for on-off switching of a given appliance such as light fixture from two separate walls or locations, such as from the two entrances of the same hall or a room.

In instances where three or more switches are needed to switch on-off the same light fixture of a given hall or room, another type of dual pole-dual throw (DPDT) switches are used. The DPDT switch or plurality of switches are connected in a given straight-cross configuration in between the two SPDT switches described above. The DPDT switches are also known as "four way" or "cross-straight" or "reversing" switches.

It is well known that two SPDT switches including the one or more reversing or cross-straight DPDT switches connected in a continuous traveler configuration provide for each individual switch to operate on its own, regardless of the other switches status.

Therefore any of the switches that are connected in such SPDT and/or DPDT setup configuration will switch on and off the light fixture irrespective of the other connected switches status. This further means that there is no specific on or off position for any of the connected switches or their levers, and the switching on or off is achieved by pushing the switch lever to its opposite position, it would be preferable to operate by a push on-push off key.

Accordingly the object of the present invention is to provide the decorative panel and key with indicators identifying the keys of the hybrid switches to be push on/push off regardless of the push position of the key, and to indicate the push position of a rocker or toggle key all of which remain flat with the surface of the frame or panel or pad while in rest position.

Another object of the present invention is to provide for connecting DPDT relay for remotely switching on-off light fixture or other electrical appliance that are connected to manual SPDT switches and to a more comprehensive switching setup that includes two SPDT and one or more DPDT switches, all using the same flat key surface, flat with the decorative coves of each of the switches.

The operation of a cascaded or chain connected SPDT and DPDT switches of the home automation electrical systems of the prior art with no error had to identify the on-off status of the appliance such as light fixture for providing accurate control command, and such data pertaining to a given circuit transmitted to the controller must include current drain, power consumption or status sensing data as disclosed in the U.S. Pat. No. 8,269,376.

For this reason the other important object of the present invention is the introduction of individual AC current sensor for each hybrid switch and AC outlet for identifying when the appliance is switched on and to operate each of the keys by a push of the key plate as directed by the indicators.

Another object is to identify the key that is identical in shape and size to be a push-push operation anywhere through the key surface or toggle/rocker operation through opposing surfaces of the flat key by pushing one surface of the key, be it up or down surface or left and right surface, guided by indicators, indicating the status of and the surface to push for reversing the status from on to off and off to on.

The status of the keys (the appliances) including lighting fixtures that are remotely controlled via the home automation controller mandates that the key indicators will indicate identical status, be it for manual switch, hybrid switch, combination switch and/or a relay without key. The indicators must indicate identical status for all the keys of cascaded SPDT and DPDT switches, manual and hybrid or combination switches need to be simultaneously controlled to indicate common status (on or off), it is enough to switch of one key or relay to reserve the indication of all the switches in the cascaded chain.

The reference to home automation controller hereafter is to a display device with control keys, touch icons or touch screen and circuits similar to the video interphone and/or the shopping terminal disclosed in the applications and the US patents referred to above.

The terms "hybrid switch", hereafter and in the claims refers to "hybrid combination of a switch and a relay", "manual switch" or a "relay" selected from a group of SPST latching relay, SPDT relay, DPDT relay, DPDT reversing relay and SPDT switch, DPDT switch and reversing DPDT switch structured for insertion into the support box and manually operated by a push flat key of the preferred embodiment of the present invention and including any other mechanical operated SPST, SPDT or DPDT switches of the prior art operated via the push flat keys of the present invention.

The term "SPST hybrid switch" refers to a stand-alone switching device for operating a given load manually and remotely.

The term "DPDT hybrid switch" refers to a stand-alone switching device with dual poles. It is used for example for operating a load in a wet or humid environment, such as bath room or laundry area for switching manually and remotely the two poles one pole feeding the live AC and the other the neutral AC.

The terms "reversing hybrid switch", "crossing hybrid switch" and "reversing DPDT hybrid switch" refer to a switching device for a given load that is switched on-off via the reversing hybrid switch and via at least one manual SPDT switch and/or via an intermediate n DPDT manual switches all connected in a cascaded chain of dual traveler lines, with each of the connected switches can operate the given load, or switch it on-off with all of switches/relays indicators will be simultaneously controlled.

A major objective of the present invention is to introduce a decorative cover to an AC outlets structured to be a plug-in device similar to the disclosed self-locking structure of the hybrid switch into a counter and complementing structure of the intelligent support box disclosed in U.S. Pat. No. 9,219, 358 comprising at least one of an optical transceiver and RFID antenna for communicating optical or RFID signal with a complementary plugs including optical transceiver, RFID antenna or an associated RFID antenna.

The optical transceiver and/or RFID antenna and/or identification setting selector are introduced into an opening or a cavity in the structured plugged-in AC outlets via a fit protruding structure of the inner cover of the intelligent support box of the present invention which is further explained in the description of the preferred embodiment.

The term "springy element" or the tactile elements of the keys refers to a bending and/or flexing ("bumping") spring or a molded part of a structure providing spring like action, or to a key comprising a spring, or is driven by a spring, or to a molded structure of a spring like element and any combinations of a spring or structure associated with a key of a switch and/or hybrid switch and/or of a latching relay, as recited in the U.S. Pat. Nos. 8,930,158, 9,018,803, 9,036,320, 9,219,358 and 9,281,147.

The terms "pin" or "pins" hereafter and in the claims refer to a connector pin, such as commonly associated with a connector, for example 8 pin plug and socket. The pin or pins referred to hereafter cover low or high current pin having flat, round or any other shape or structure for joining a support box to wiring devices such as an outlet and a switch.

The term "joint" and "joints" hereafter and in the claims refer to a pin and to a socket or a receptacle that are jointly connecting the complementing or reciprocating pin and receptacle or socket for interconnecting AC wiring devices with a support box.

BRIEF DESCRIPTION OF THE DRAWINGS

The foregoing and other objects and features of the present invention will become apparent from the following description of the preferred embodiments of the invention with reference to the accompanying drawings, in which:

FIGS. 1A~1D are perspective illustrations of the prior art showing the installation and assembling of the wiring devices, the decorative cover and the keys of the prior art as disclosed by the referenced US patents and the well known glass cover;

FIGS. 2A~2C are perspective and exploded view illustrations of the elements of dual gang support boxes installed with electrical power outlet, dual SPST hybrid switches and a combination of SPDT or DPDT manual and hybrid switch of the preferred embodiment of the present invention;

FIGS. 2D~2E are perspective view of using specific wider sizes of cut sheet decorative glass for a key and the frame.

FIG. 3A shows the rear view of the different hybrid switches and the AC outlets of the present invention;

FIGS. 3B~3C are perspective exploded view and illustrations of the elements and the assembling of three hybrid combinations of switch-relay, or hybrid latching switches of the preferred embodiment of the present invention including a detailed glass elements of the decorative covers and keys;

FIGS. 4A~4B are perspective exploded view and illustrations showing the elements for assembling hybrid switch and AC outlet into a triple gang support box including the element of the decorative covers and keys;

FIGS. 4C and 4D are perspective illustrations showing the linking of an optical data and RFID signals between AC power plugs and AC outlets including the attachment of RFID tag to the AC power plug of the prior art.

FIGS. 5A~5C are perspective exploded view and illustrations showing the assembling of three SPDT hybrid and manual switches into the intelligent boxes of the present invention for a cascaded chain of SPDT and DPDT hybrid switches, mechanical switches or switch-relay combinations of the present invention including the rear view and the push in accesses for the wires with the assemblies covered by a decorative plastic molded frame and keys.

FIGS. 8A~8C are perspective views and illustrations showing the eight gang support boxes with non-limiting versatility of the intelligent boxes of the present invention for supporting a whole range of AC outlets as used in the different countries or regions of the world in an identical size casing covered by molded plastic and cut glass frames and keys and the introduction of RFID tags and optical accesses.

FIGS. 10A~10D show exploded view and illustration of a touch screen structured to be identical in size and shape with the assemblies of switches and outlets shown in FIGS. 2A~9.

FIGS. 10E-10F shows the assembled touch screen with 16 touch icons to be fit for installation side by side with the decorative covers of the present invention;

FIGS. 11A~11B are perspective views of the self-imprinted adhesive labels to cover and indicate the touching positions, along with decorative motifs, images and touch icon names of the present invention to be adopted and/or imprinted by the user;

FIGS. 12A~12D are cut views of the key action spring of the push key in a released and pushed at its center, left end and right end;

FIGS. 12E-12G are perspective and exploded views illustration showing the details of the key spring and structure of the push-push hybrid switch assembly of the preferred embodiment of the present invention;

FIG. 13A-13G illustrate the action steps of the key spring of the hybrid switch shown in FIGS. 12A-12D, as operated by push to lock and latch, and push to release of the preferred embodiment of the present invention;

FIGS. 14A~14G show the operating steps and perspective views of the key spring action of mechanical actuated switches via a flat glass key, and an exploded view of their assembly of the present invention;

FIGS. 15A~15D show perspective views of the decorative covers and the attachment details onto the support boxes of the present invention;

DETAILED DESCRIPTION OF THE PREFERRED EMBODIMENT

Figure 6A:
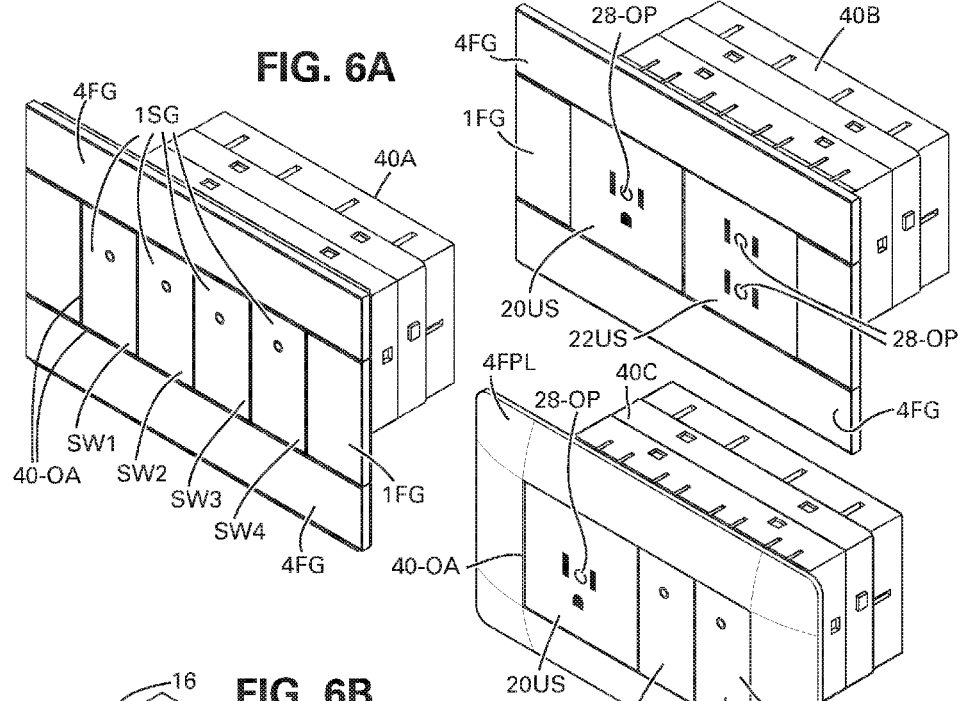
FIGS. 6A~6B are perspective illustrations showing the versatility of the expanded decorative covers and keys of the four gang support boxes of the preferred embodiment of the present invention.

FIGS. 1A~1D show existing prior art of electric wall boxes as used in Europe and many other countries and regions including the supporting frames, the wiring of and the decorative frames or covers of FIGS. 1A and 1B. FIG. 1D further shows a decorative cover made of support frame and front glass cover. FIGS. 1A-1C show the "not so simple" installation of switches and power outlets of the prior art.

The shown automation devices and relays in FIGS. 1A~1C are disclosed in the listed U.S. Pat. Nos. 7,639,907, 7,649,727, 7,864,500, 7,973,647, 8,041,221, 8,148,921, 8,170,722, 8,175,463, 8,269,376, 8,331,794, 8,331,795, 8,340,527, 8,344,668, 8,384,249, 8,442,792, 8,594,965, 8,638,087, 8,639,465, 8,930,158, 9,281,147 and corresponding patents and pending patents in other countries and regions.

The prior art of power outlet including the SPDT and DPDT switches disclosed by the above recited patents further disclose intelligent circuits for measuring, calculating and reporting the power consumed through the AC outlets and switching circuits by a given load or appliances.

The recited SPDT or DPDT switches in the above listed patents are connected to SPDT relay, each comprising a relay control and communication circuit for operating the load via the relay and for reporting the current drain or the power consumed by the connected load or the appliance.

The communication circuits for control and reporting the power consumption are selected from a group comprising optical via fiber optic cable or lightguide, RF, IR in line of sight and electrical signal via bus line.

The control, command and communication of the prior art are shown in FIGS. 1A and 1C to be optical signals propagated via cascading lightguide. The term lightguide is a term used for plastic optical fiber cable, known also as POF (Plastic Optical Fiber), however other optical fiber cables and IR and RF signals can be used for the control and communication of the prior art, including low voltage busline control signal via command signal converter.

The supporting frames of the prior art (numerals 20F in FIGS. 1A-1C are in fact standard supporting frames as used in Europe to install standard on-off (SPST) single pole single throw or two way (SPDT) single pole dual throw, or cross-straight (DPDT) dual pole dual throw (known also as reversing) AC power switches, including AC outlets by a simple locking structured fasteners. The wiring of the switches and the sockets are shown in FIGS. 1A and 1C to be extensive, time consuming and prone to errors by installers.

The solution to reduce the wiring and introduce electrical automation grid is disclosed in U.S. Pat. No. 9,219,358 for an intelligent support boxes, and a whole range of hybrid switches disclosed in U.S. Pat. Nos. 9,018,803, 9,036,320 and 9,281,147.

The shown prior art of FIGS. 1A~1D greatly differs from the novel introduction of intelligent support boxes, hybrid switches and reporting outlets also in their mechanical and connection structures.

The only items that is conceptually similar are the decorative frames shown in FIGS. 1A and 1B and the glass frame shown in FIG. 1D which also show a well known decorative cover. The glass cover is esthetically pleasing but it is costly and rarely used in new buildings because of costs and budget limits. As explained above in the summary of the invention, the costs and blemished esthetics due to the shown plastic frame to cover the inner cutting are the main reason for the limited use of otherwise desired architectural design of flat and pleasing wall mounted devices.

FIG. 2A shows a supporting box 20A for accommodating two electrical hybrid switches H1, each comprising guides 15 for guiding the switch into position via the shown concaves or indentations 35, self-locking convex 14 and body stoppers 16 for locking each switch by a locking arm 34 of the support boxes, when a hybrid switch H1 is inserted into position within the box 20A via the guides 15 and the indentations guides 35. The support box 20B is sized to be a replacement box to the shown outlet and frame in FIG. 1D of the prior art.

The box 20B shown in FIG. 2B is sized to be mounted into two gang European electrical wall box but can be mounted into the known 4"×2" standard US wall box and to be attached by screws via the mounting holes 32 of FIG. 2A.

The other support box 20D shown in FIG. 2C is also mounted into a two gang square electrical wall box, or rectangular such as 4"×2" wall boxes in the US, or such as 60 mm round box (not shown) used in Europe. Many other wall boxes having variety of lengths, widths and depths are available. All the different known wall boxes, including the 60 mm round wall boxes that fit the two gang support box 20A size are standard and commonly available at low cost.

The surrounding supporting frames 20F shown in FIGS. 1A and 1B are designed for attachment to three gang and four gang wall boxes discussed further below. The plastic molded frame of the present support boxes are designed similarly for attachment to different wall boxes with the shown hybrid switches H1, H2, H3 and H4 and the shown power outlets 20US, 20EP, and other outlets are accessed through a square opening access 20-OA and a rectangle opening access 30-OA~80-OA shown to be an accessing inner frames with right angles, also known as 90° angles in FIG. 2A to FIG. 9, and are fully discussed further below.

The decorative covers are adjustable to be flat with the wall surface by their self-locking serrated studs or self locks 33A of FIGS. 15A-15D inserted through the four locking sockets or receptacles 33 (1-4) of the frames 31 of the support boxes, shown on the four corners of the frames of the support boxes of FIG. 2A and through the latching tip 34A and the reciprocal studs 33A-1 to 33A-8 of FIGS. 15A and 15D.

The shown frames 31 of the supporting box 30A of FIG. 3A is a frame of a three gang support box which is similar to the well known and commonly used supporting frame 20F for locking the wiring devices known in FIGS. 1A-1C to be mechanical switches and relays used for lights and the commonly used power outlets, all connected at their rears or sides to the electrical power wires via screws or self-locking electrical terminals, shown in the prior art of FIGS. 1A-1C.

As the present invention of keys and frames are structured for use also with common mechanical switches disclosed below, the other object of the present invention is to redesign novel keys structured in a distinct difference to the commonly used rocker or toggle manual switches, to include flat toggle or push keys for use with flat panels with no blemishes and/or protruding keys.

Accordingly, one obvious difference between the illustrated support boxes in FIGS. 2A~2C and the prior art supporting frames of FIGS. 1A~1C are the back or the rear of the support boxes, including all the pins, receptacles and terminals for self-locking hybrid switches and outlets shown in FIG. 2D including manual switches shown in FIGS. 14A-14G.

The other differences are the back surfaces and structure of the hybrid switch and power outlet shown in FIG. 2D that are structure and shown in FIGS. 2B~2D to be without the well known wire terminals, ready for self-locking action by a simple insertion into the supporting box 20A or 20B and disclosed in the U.S. Pat. No. 9,219,358.

The hybrid switches H1(SPST), H2(SPDT), H3(DPST) and H4(reversing DPDT) are shown in FIG. 2D to include live line pin 18, load pin 19, coil pin C1 and key indicator access K1 for passing multi color light emitted by an LED of the support boxes. The single AC power outlet 20W and dual power outlets 22W of FIG. 2D are shown to include single and dual live AC pin 28 and dual AC pins 28-1 and 28-2 respectively, neutral AC line pin N, a receptacle entry GND for the ground or earth pin G shown in FIG. 4A and an access for a single sensor 23 or dual sensors 23-1 and 23-2 comprising RFID, optical or both.

By the above it is clear that the structural differences between the prior art wiring devices supporting frames of FIGS. 1A-1C switches and outlets and the intelligent supporting boxes, being intelligent or the simple locking terminal boxes with the plugged-in hybrid switches, power switches, relays and power outlets demonstrate a clear fundamental structural difference.

Assembled wiring devices such as shown in FIGS. 1A-1D may be perceived or argued, taking the front view or the key side (if they are operated by a push key) that the switches and outlet are similar in their structure, which they are not. The keys of the commonly used power switches of the prior art are not push-push type and are not flat.

Moreover, each of the mechanical switches and outlets of the prior art is individually connected to the power wires accessed through the wall box and therefore require extensive work for connecting the many wires to the plurality of outlets and switches confined to within the wall box. In contrast the support box connects to few wires and the hybrid switches including the power outlets as disclosed further below are plugged-in through the front of the frame 31 and into the receptacles for the devices pins 18, 19, 28, 28-1 and 28-2 and the GND pin into the receptacle 23 of the power outlet.

The substantially reduced number of power and ground wires are connected through self-locking terminals surrounding the back cover of the support boxes of FIG. 5C. This arrangement reduces the number of wire connections, the time it takes to mount each individual switch and outlets, and thereby reducing significantly the errors experienced in connecting the individual power wires.

While this by itself introduces a substantial improvement to the prior art structure and facilities, this is without considering the intelligence and automation added to the electrical wiring and system of a given residence or business buildings.

Further, the support boxes of the present invention with no automation control or intelligence simplify the prior art of electrical installations. It becomes clear that the combined cost of the mechanical SPDT or SPST switch and the power outlet of the prior art shown in FIG. 1A and the installation of can be substantially reduced by eliminating the wire terminals and by replacing the wire terminals with plug-in pins 18, 18A, 19, 19A, 19B, 28, 29, N and GND of FIG. 2D.

The other cost saving is the support frame 31 that is modified or transform the support box to lock the insert terminals 1G and the pre structured corresponding receptacles disclosed in the U.S. Pat. No. 9,218,358. All above is prior to the introduction of the intelligent circuits and other elements discussed below.

Figure 17:
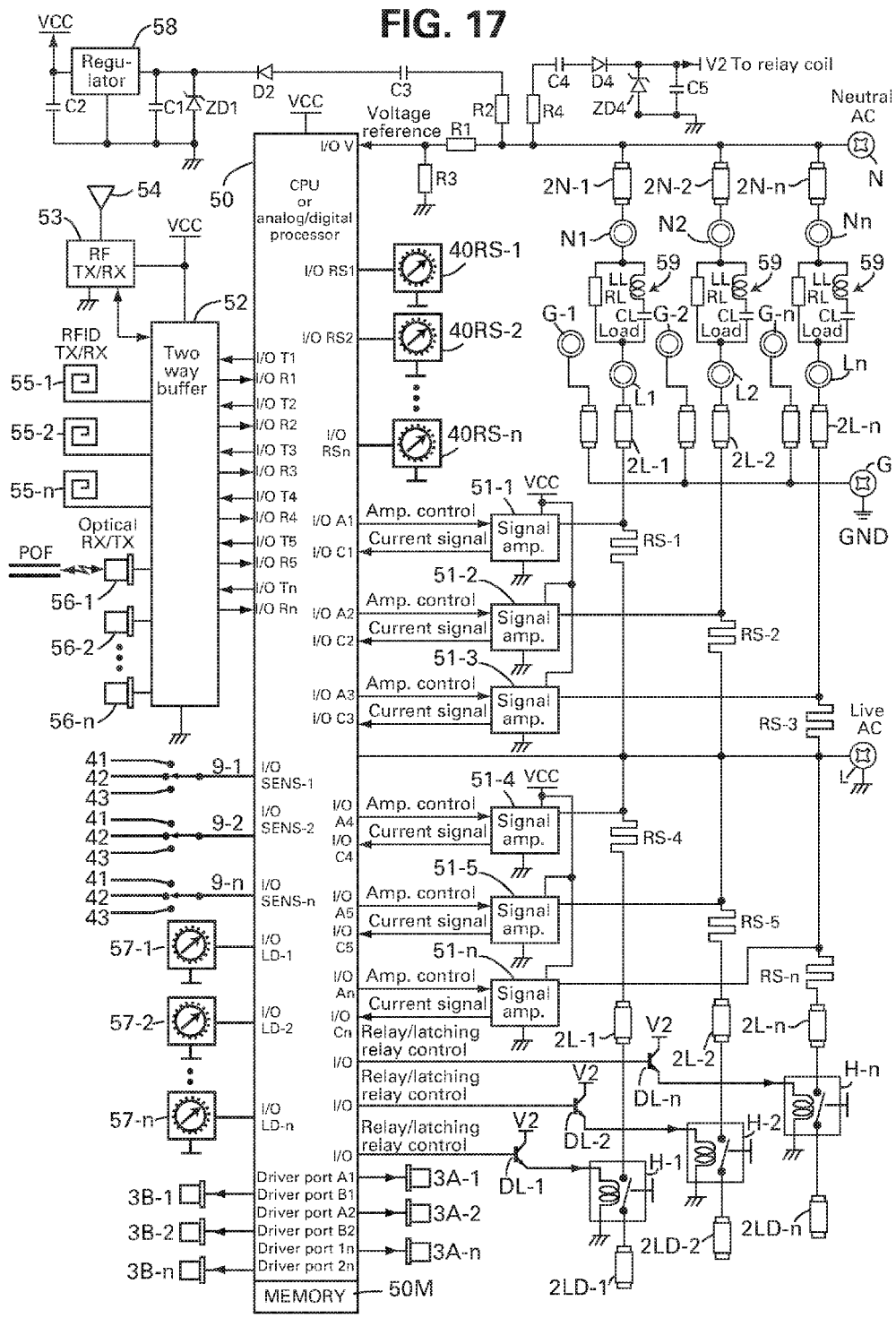
FIG. 17 is a simplified electrical block diagram showing the circuits of the intelligent support box of U.S. Pat. No. 9,219,358 with emphasis on the operation of the keys indicators and the RFID and optical accesses of the AC outlet of the present invention.

The details of given intelligent support boxes are fully described in the U.S. Pat. No. 9,219,358 and are introduced herein by reference, including the communication, operating and reporting, including the operating circuits shown in FIG. 17, are discussed further below.

Accordingly, the present invention will be meaningful, architecturally pleasing, convenient to operate and effective which is the first and main objective of the present invention. The other objectives are to substantially reduce the time and cost of installing the modified electrical wiring devices versus the costly and time consuming installation of the prior art. This is achieved by using the modified keys of the electrical switches and the support boxes and frames and provide architecturally attractive structured frames of the present invention and apply the plug-in installation methods recited in U.S. Pat. No. 9,219,358 and shown herein.

The support boxes can be expanded to accommodate n number of hybrid switches, mechanical switches and power outlets as shown in FIGS. 2A~9. The illustrated support boxes are configured as 2, 3, 4, 6 or 8 gang boxes. A "gang" is equal to the width size of the hybrid switches H1~H4 which are similar to the width size of the prior art mechanical switches, ranging to be between 22~24 mm, or less than 1" width. However any variation of the switch sizes can be accommodated by introducing reciprocating sizes to the intelligent or non intelligent support boxes and similarly reciprocating sizes to the keys and the decorative frames of the present invention.

For better clarity of the terms used for the elements positioning within the frames and the physical measurements or the sizes of the elements that form the decorative frames and the keys the terms used hereafter and in the claims, including top (bonding) space, bottom (bonding) space, left (bonding) space, right (bonding) space, top insert, bottom insert, left insert, right insert, insert width, insert length, key length including variations of key width are disclosed in FIGS. 2D, 2E and 3B.

The term "identical" hereafter and in the claims does not refer to an exact measurement or structure of a given key and frame elements, it refers to the similarity in the shape, size or simply to look alike visually and/or esthetically and/or architectural.

The power outlets, be it the ME (Middle East) used in Israel and other middle eastern countries plugs and socket, or the DE type used in Germany and overall in Europe, or the FR type which is a French version of the European plugs and sockets, including US and the Japan power outlets for two and three pin plugs that include Japan power outlets, for both two pin and three pin plugs. The power outlets for Australian type plug AU that are also used in China and the UK and Hong Kong outlets 20GB for British standard plug GB and any other standard plug of all given countries can all be accommodated in dual gang box sizes.

For example the hybrid switches H1~H4 width size is 23-23.5 mm the width of the power outlet will be between 46-47 mm. All the different power outlets are shown in FIGS. 2B, 4A, 4B, 6A, 6B and 7A to 9. Dual power outlet for two pin 22US and Japan, China 22CN and 22+CN and Europe 22EP are also shown accommodated in the same dual gang size, or 46 mm or 47 mm width and height of 44~45 mm. For simplicity and standard the power outlet and the outer cases of other outlet such as PC, telephone or audio connector can all be made in right angle square outer case such 45 or 46 mm.

Figure 9:
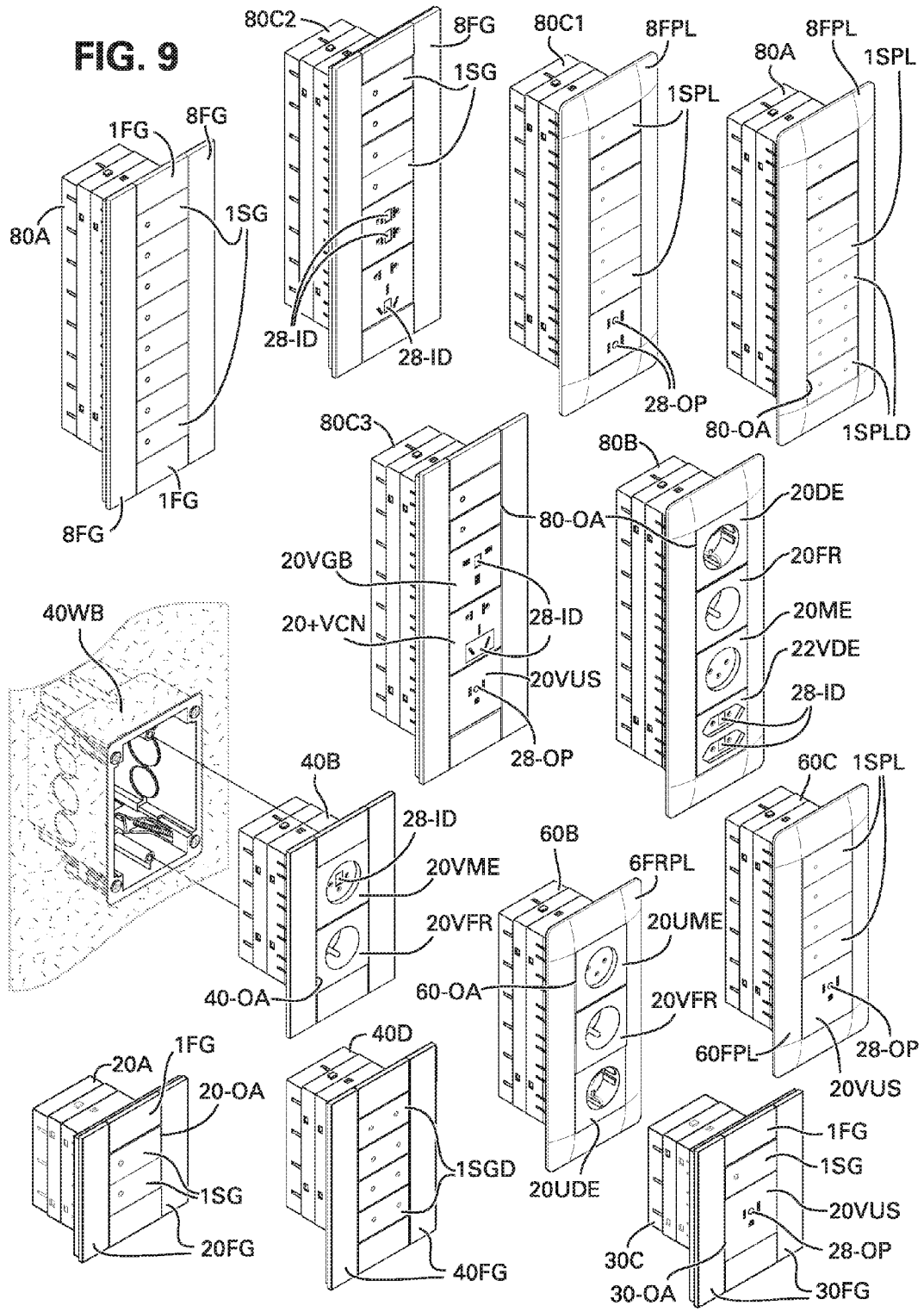
FIG. 9 shows a perspective views illustrating the different support boxes that can be mounted vertically for supporting modified power outlets shown in FIGS. 2B, 4A, 4B and 6A-9 structured for mounting into vertical column boxes and an example of a typical wall box for the three gang support box.

It is important to note that the power outlets are also structured for vertical mounting, enabling the installation of power outlets into a vertical column shown in FIG. 9 wherein the Middle East outlets VME, the French VFR outlets, the Australian VAU outlets and the VUS outlets are structured with the locking convexes 24 and stoppers 26 of FIG. 2D are on the left and right surfaces of the outlet cases (not shown) for attachment into vertically mounted support boxes, versus the convexes 24 and stoppers 26 that are introduced at the top and bottom surfaces of the outlet cases for attachment into horizontally mounted support boxes as shown in FIG. 2D.

From the above explanation and the assemblies shown in FIGS. 2A~6D it is obvious that the flat keys and flat frames for the support boxes, of the present invention and for a similar structured switches and outlet mounted onto the frames of the prior art can well be adapted to provide versatile, simple and low cost installation with superior decorative covers and keys for the many different outlets that are known as standard outlet in any given countries and regions.

The support boxes are also structured to accommodate plug-in mechanical switches structured to fit the size and shape of the prior art wiring devices to offer many other advantages, including the use of the intelligent support boxes disclosed in U.S. Pat. No. 9,219,358.

As disclosed in U.S. Pat. Nos. 8,594,965, 8,930,158 and 9,219,358 the intelligent support box include sensors 28OP and 28ID that are further discussed later in connection with the block diagram of the electrical circuit, but it is obvious that the OP (optical) sensor 28OP or the ID (RFID) antenna 28ID are clearly shown in FIGS. 4A-B and 6A-9 to be accessed from the front surface between the power pins entries into the outlet.

The optical transceiver and the RFID antenna of FIG. 4A are introduced into a sensor receptacle 23, 23-1 and 23-2 at the rear center of the power outlet structure, shown in FIG. 2D, to reach the front surface of the outlet. The sensor 38OP of FIG. 4B is the shown opening of an optoport 38OP in FIG. 2D or the shown flat recess with no opening for the RFID tags 20B, 20U, 20A or 20EU of FIGS. 6B and 7A.

It is important to note that the shown plugs and outlets with attached RFID antenna and tag or the optoports are structured to be introduced to a three pin plug and outlet and two pin plug and outlet, using identical RFID tag and optoport position. This is particularly important for such plugs and outlets used in the US, EU and Mid-eastern countries having two pin plugs with 19 mm pitch that can be reversely plugged and this mandate the introduction of both the RFID antenna or the optoport at the center of the two pin plug to be always in direct optical link and in close proximity for the RFID communications.

Figure 7A:
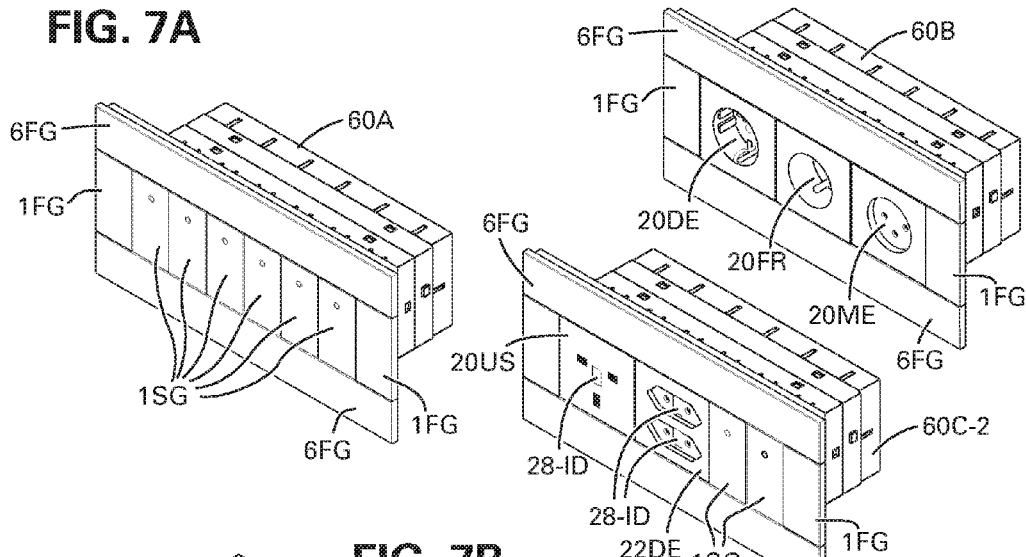
FIGS. 7A~7C are perspective illustrations showing six gang support boxes and the non-limiting versatility of the intelligent boxes of the present invention for supporting a whole range of AC outlets as used in the different countries or regions of the world in an identical size casing covered by molded plastic and cut glass frames and keys and the introduction of RFID tags and optical accesses.
Figure 7B:
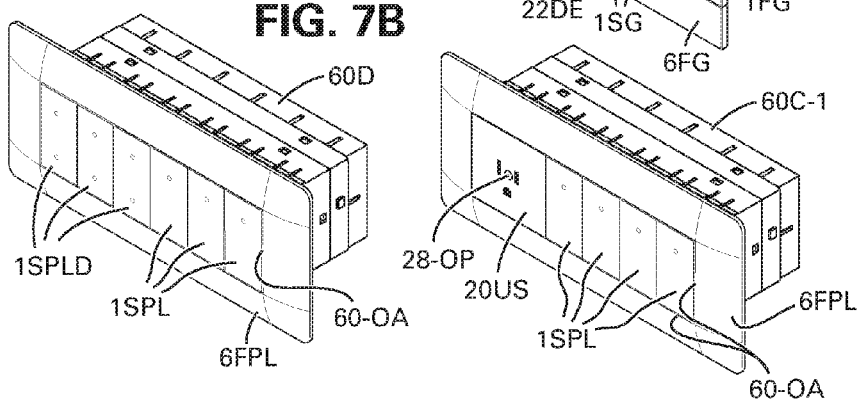
Figure 7C:
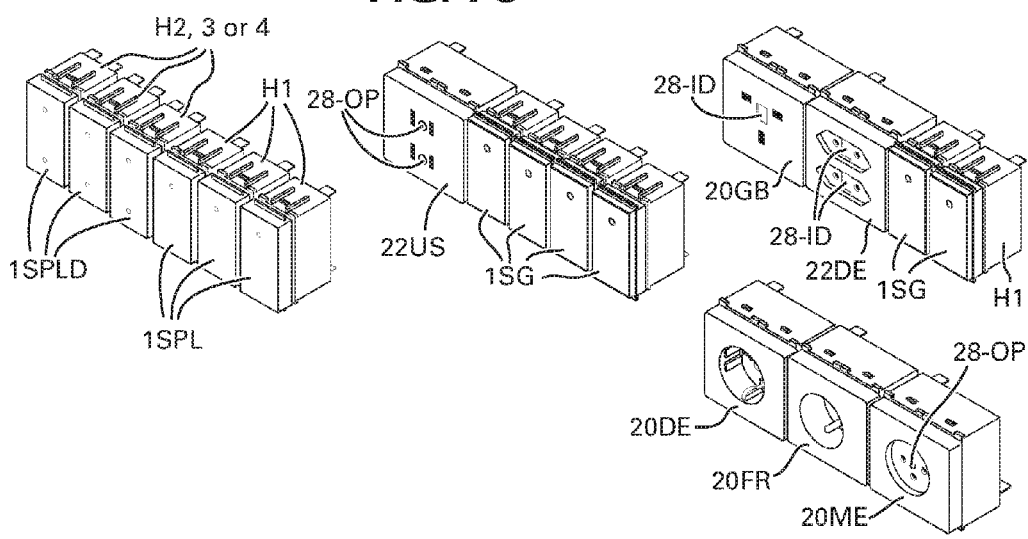

The optoport OP are shown in FIGS. 7B and 7C in the center 28OP of the shown outlet front surface such as 20US with 28OP, 22US with dual 28OP, the DE and ME outlets 22DE with dual 28OP and 20mE with single 28OP illustrated sockets in FIG. 7C.

As shown in FIG. 4C is the location of the optical transceiver or transmitter of the prior art for communicating identifications, power consumption and/or for exchanging two way data including updates, calibrations, control, commands and reporting statuses and similar, is located between the two pins of the US/Japan and China plugs as well as the 2 pin EP, ME and China plugs including other countries that employ 19 mm pitch or distance between the two round pins having diameter of 3.9 mm~5 mm.

For all such countries it is simple and convenient to install the optical transceiver 28OP to communicate at the center of the two pin ensuring perfect alignment regardless of the attachment of the plug into the outlet with straight or reversed plug.

Same applies to the RFID tags shown in FIG. 4D showing the attachment of the RFID tag for communicating the appliance identification with the RFID reader 28ID. The RFID tag thickness of less than 1 mm is accommodated into a recess between the two pin entries of the power outlets 20US or 22US of FIGS. 6A-6B or the EP power outlets 20EP and 22EP of FIGS. 7A and 7C.

The recess for the RFID tag and the optical transceiver of the prior art shown in FIGS. 4C and 4D are differently positioned in the example of the GB plugs and outlets and/or the Australia 3 pin plugs and outlets.

These two types of plugs are not commonly supplied in two pin types. Some are used in Australia, but the same three pin plugs that are used in China shown in FIG. 8C as 20CN and 20+CN, are never provided in two pin. Therefore the sensor center for the single 3 pin socket or the combination CN socket 20+CN not precisely into the center, same applies to the GB 3 pin outlet 20GB shown in FIG. 8C.

It is very important to ensure that the RFID tag and the RFID antenna are communicated from a close proximity to avoid reading the RFID tag by an adjacent RFID antenna, such as for example, the adjacent outlets 22DE of FIG. 7A, showing dual RFID sensors 28ID.

Figure 6B:
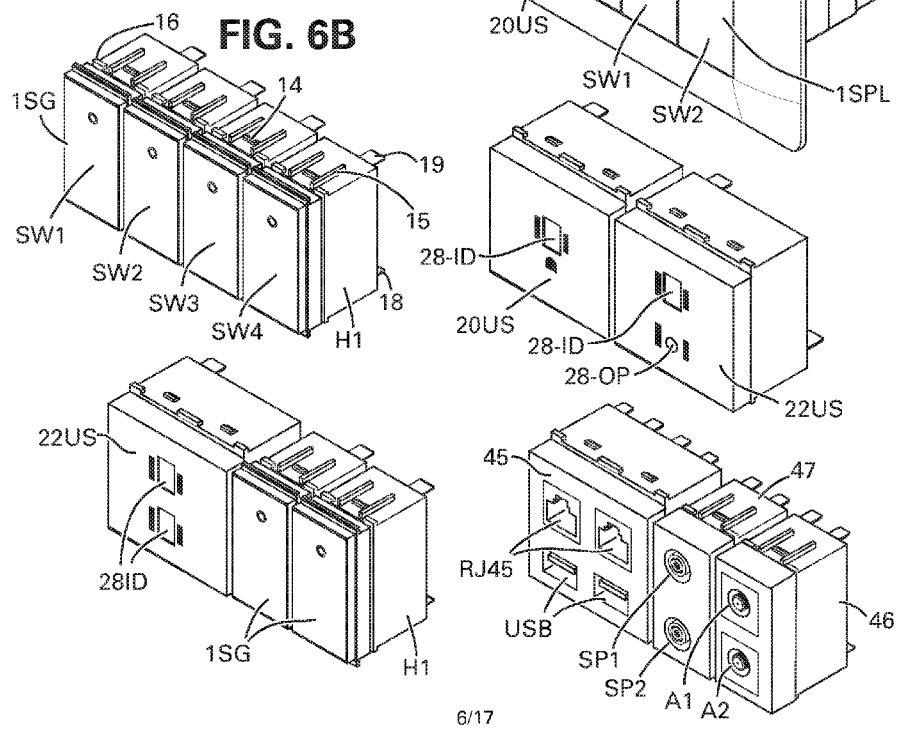

It should also be clear that the RFID tag of FIG. 4B can be introduced onto the two pin US plug and into any of the 20US or 22US outlets SU of FIGS. 6A-6B. Such introduction however has to ensure that no adjacent reading of the RFID tag is possible. This mandate small size antenna and RFID coil and the use of a lower frequency RFID band such as 125 KHz, which is explained in U.S. Pat. No. 8,930,158 (the prior art).

FIGS. 10A-10F show a touch screen for operating wiring devices and appliances connected within an home automation grid disclosed in U.S. Pat. No. 8,742,892 structured to be covered by glass panels shown as 20TG, 30TG, 40TG, 60TG and 80TG designed to match the sizes, appearances and colors for installation along with the switches and outlets disclosed and shown in FIGS. 2A-9 above to fully accommodate the architectural needs and the desire for unified designs throughout for electrical and appliances control in premises.

The technical details and particulars of the touch screen are fully disclosed in the reference U.S. Pat. No. 8,742,892. The shown structures in FIGS. 10A to 10E are the basic elements of the touch screen comprising the body 20T, 30T, 40T, 60T and 80T that are attached to a reciprocal wall box size, or directly onto a wall or other flat structure such as a pole or partition (not shown) via the frame mounting holes 32.

The disclosed well known twist pair copper wire connecting the touch screen to a bus line for communicating with and powering the touch screen via the home automation bus line network are disclosed in the referenced U.S. Pat. No. 8,742,892 and be applied. Alternatively the body and the circuit PCB can be structured with well known push in connector (not shown) for locking the twisted pair wires to eliminate the screws used for the terminals of the U.S. Pat. No. 8,742,892.

Otherwise the PCB, the base body assembly including the touch surfaces of icons design can be identical or similarly displayed icons as shown in the referenced patent.

The setting selectors for assigning an identifying numerals to each touch panel or to a specific switch or outlet, is similar to the numeral assigning of the intelligent wall box and is shown assigned via a setting selectors SS-1 to SS-n. In practice residences do not anticipate more than 2 digits code, but for large premises or houses or other specific settings the need for more digits identification may be needed, and for this reason the shown two setting selector may become three or "n" selectors. Alternatively, the setting can be provided by the main automation controller installing directly an identification number into a memory (not shown) of each touch screen independently.

The shown self imprinted sticker which is provided in matching colors to the touch glass over 20TG~80TG and the supporting frames 20TF~80TF of FIGS. 10A-10E are imprinted using a program downloaded into PCs for printing via a standard size A4 or 8"×11" printers as shown in FIGS. 11A-11B.

The touch glasses 20TG-80TG are shown in FIGS. 10A-10E separated from the support frame 20TF-80TF, but are supplied fixedly attached (bonded) to the support frames that are attached to each body 20T-80T by self locking convexes or ridges 80R that attach the glass cover assembly to the body via a cutouts or concaves 80C.

The stickers 20ST-80ST are offered in the different colors for matching the frame and switch keys colors for self sticking onto the front of the assemblies 20T-80T and are provided with self adhesive that is easy to remove and replace by freshly imprinted sticker when the user of the touch panel wishes to change the setting, which are set via the bus line (not shown) through the system controller (not shown).

As shown in FIG. 11A the self imprinted stickers 20ST-80ST are provided in precut form for the different sizes and can be imprinted using a program loaded to the PC and printed by standard printer PR to output any one of or all of the pre-cutout labels such as eight cuts of self pre-imprinted 20STP and 30STP, shown in FIG. 11B.

The other shown imprinted sticker 30STP includes decoration motifs such as flowers 1DM shown along with lighting on-off 1STL of the living room, 1STK of the kitchen and 1STD of the dining room including the lights of the bed rooms 1STBD1 of James, 1STBD2 of Joanna and 1STBD3 of Mom. The other imprinted stickers 20STP show the lighting switching of James and Joanna etc. The vertical columns sticker 60STP-V show the switching of all lights 1STAL, water boiler 1STBO, switching on-off of the TV and many more.

All the above self-imprinted labels as selected, set and imprinted by the user or the installer at any given time prior to the installation or afterwards can be imprinted as set as it becomes needed, wanted or necessary.

The imprinted stickers can be printed with design motifs similar to the 30STP shown with decorative lines to be in line with the switches and outlet decorative frames and key presenting an architectural perfection for the wall mounted wiring device and touch pads. All the imprinted stickers and the glass panels are further imprinted or silked screen with dividing lines to appear as being in exact structure partitioned by the lines 80S between the frame and the keys, such as to appear in perfect design harmony throughout.

FIGS. 12A-12D show a cut view of a spring driven push key, structure for actuating a center plunger 13P by a push action through the center C of FIG. 12B and both corners L of FIG. 12C and R of FIG. 12D.

The driving spring 12SP is designed to operate in a tactile action/movement wherein a push by a finger 50 on the left or right side or push on any other portion of the key surface will cause the center bend 12SP-C of the spring 12SP to move in a forceful tactile action and pressure the plunger 13P fully.

Stopping the push action by moving the finger 50 away will release the spring center bend 12SP-C away from and release the plunger assembly 13P into a release position by the expanding spring 13S as shown in FIG. 12A.

The spring 12SP is held into position on the top of the switch by two semi circle cutout 12RH supporting the circled structured hinges 12R of the spring 12SP, such that the up/down tactile spring movements (as shown in FIGS. 12A-12D) will be smooth with minimal loss of the applied pressure and with no tension experienced by the bending of a fixedly supported spring, making the shown four hinges 12R a tension and friction reducing structure that is important for reducing the force needed to apply for actuating the tactile actions, establishing the level of the finger push pressure onto the key and the resultant push of particularly the double poles 13ML and 13MR of the switches H3 or H4 of FIG. 3A by the plunger 13P onto the latching device or unit 13LD that latches the poles shown in FIG. 12E.

The cut views of FIGS. 12A-12D show a single plunger pin 13P but the structure of shown receptacle 13R can be the single plunger 13P or the dual plungers 13PL for left, and 13PR for right plunger each pushing one pole. Shown in FIG. 12E are dual micro switch poles 13ML and 13MR. Even though not shown it is possible to have n number of poles being pushed by n number of plungers 13P for a multi pole switch for appliances operating by three phases (as an example).

The spring 13S extended between the plunger receptacle 13R and the plunger support guide 13G is soft spring for maintaining the receptacle at its released position at all times. The spring 13S is compressed only while the key 1SG or 1SPL is manually actuated. This is particularly important to separate the plunger 13P from the latching device 13LD so as to provide a condition that the two independent actions, via the push key and the armature, for latching and releasing the micro switch poles, will not interfere with each other. The need to prevent collision is particularly clear when the two separate actions coincide to be at the exact same time. This includes the switching on or off, or the switch over, or reversing the straight/cross provided by the hybrid switches assemblies H1-H4 of FIG. 3A.

The shown plungers 13PL and 13PR in FIG. 12E are shown without the springs 13S, as the drawing become overly congested, but the two springs 13S are extended between the receptacle 13R and the support guide 13G as shown in FIGS. 12A-12D.

There are many possible actuating points or positions along the spring 12SP. The shown actuating positions are 12SP-A and 12SP-B. Depending on the needed pressure to exert upon the spring to provide the needed power by the spring 12SP for a tactile action at the spring center bend 12SP-C. The key base 12 shown in FIGS. 12A and 12B is designed with actuating bars 12A on each side of the key base, pushing the spring at about its mid left and mid right spring marked as 12SP-A (recessed positions) for actuating the plunger via the center area or spaces 1-C of the keys 1SPL and 1SG of FIGS. 12E and 12F. The shown bars in FIG. 12E are 12B which provide higher tactile force needed for the dual poles 13ML and 13MR, which a finger in the center 1C will provide.

The terms base key and key base are reversed through the description in line with the covering sentences, but refer to the base key 12 of FIGS. 12A-13G and 16A-B and to base key 120 of FIGS. 14A-14B and 16C-D.

Accordingly, for providing an actuation push within the center space of the keys the use of the push bars 12A of the base key 12 will be sufficient. The bars 12A could be used also for a push throughout the keys surface if the needed force by the tactile action is a limited force.

Using the push point or position 12SP-B of the spring 12SP via the push bar 12B shown in FIGS. 12C-12D, 12E and 12Q will provide stronger tactile action by the finger 50 pressure, as applied to two sides of the keys as shown in FIGS. 12C and 12D with FIG. 12C combining eight bars, four 12A and four 12B as shown also in FIG. 12G.

The base key 12 shown in FIGS. 12D and 12E is provided with four push bars 12B as operated in FIGS. 12C-12D and the base key 12C shown in FIG. 12F is provided with four push bars 12A shown operated in FIG. 12B.

FIG. 12G shows the base key 12G with both the four push bars 12A and the four push bars 12B for providing a power tactile action by the spring 12SP for any push throughout the keys, be it 1SPL or 1FG Providing a flat key, flash with the surface of the decorative plastic and glass panels of the present invention that are conveniently operated and provide the esthetically pleasing architecture desired by architects.

Shown in FIGS. 13A-13F are the operation of the mechanical actuated hybrid switch via the base key 12 of the present invention, with the key actuated throughout the surface of the base key 12 by a finger 50.

FIG. 13A-13C shows the three basic states of the latching elements of the hybrid switch FIBS (H1-H4), to include the coil 13CL, the armature 13AR, the latching device 13LD, the push arm 13PA, the plunger 13P, the plunger spring 13S, the plunger support guide 13Q the receptacle 13R and the actuating spring bend 12SP-C shown in FIGS. 12A-12F.

The many elements involved in the hybrid operation of the switches H1-H4 made the drawings congested and an important item in the latching process, i.e. the push arm 13PA that is small size element that is hardly noticeable within the congested drawings.

The shown push arm 13PA in FIG. 13A is the element being actuated by the armature 13AR when the coil 13CL is powered by a power pulse, having given time duration of n milli seconds. The movement of the latching elements are fully disclosed in the U.S. Pat. Nos. 9,018,803, 9,036,508, 9,257,251 and 9,281,147.

As the descriptions here relate to the present invention, it is important to know that the push of the base key 12 for actuating the plunger movement is limited by the limits of the push arm movements from its release position shown in the release state of FIG. 13A to a maximum push state (for the length of time the key is depressed) by the finger push of the key base 12 (or the pull of the armature by the magnetic coil) shown in FIG. 13B.

There are three "stop" or "parking" states for the push arm, the "stop" may be short time duration, measured in a fraction of a second, or the maximum push by a finger shown in FIG. 13B. The other two are the release state shown in FIG. 13A and the partial release state shown in FIG. 3C.

The partial release state provide for releasing the latching device from its latching state, as a latching state with the plunger being at its maximum push state cannot be further pushed to enable a switch over to a release state. The partial release function is fully explained in the above listed U.S. Pat. Nos. 9,018,803, 9,036,508, 9,257,251 and 9,281,147.

For this reason the "parking" state of the partial release shown in FIG. 3C is a state to enable either the armature 13AR to re-push the push arm 13PA or the plunger 13P the further or re-push the latching device 13LD to switch over the latching device by short time (and distance) actuation. Be it by the magnetic pull of the armature 13AR or by a push of the key onto the latching device 13LD or both (if the push time coincides).

FIGS. 13D-13F-2 show the combination states of the latching and the micro switch pole(s) 13M statuses during the touching time (fully pushed), release time and partially released.

FIG. 13D-1 shows the released state of the base key spring 12SP, the released state of the latching device 13LD and the released state of the micro switch pole 13M, wherein the spring 13S is shown fully expanded, pushing the receptacle 13R upward into a release state.

The upward movement force and the state of release of the latching device 13LD are provided by the spring 13MS force during the release state in which the micro switch pole contact engages contact 18A. All other details of the latching concept and movement are fully disclosed in U.S. Pat. Nos. 9,018,803, 9,036,508, 9,257,251 and 9,281,147.

FIG. 13E shows the state of a finger push throughout the key base 12 surface for actuating the hybrid switch in which the spring 12SP is compressed and its center bend 12SP-C is forcefully pushing in a tactile action the receptacle 13R and the plunger 13P, compressing the spring(s) 13S and pushing via the plunger 13P the micro switch pole 13M to switch over to one of engage the contact 18B or engage no contact (off state) by the micro switch pole movement (that is well known).

During the push and the tactile action by the spring 12SP the latching device 13LD and the push arm 13PA are pushed to a maximum stretch, wherein the push arm 13PA is physically stopped by the coil bobbin top surface 13CL. No further movement is possible and at this point the push arm 13PA and the latching device 13LD must be "parked" and be partially released in a reverse small step for enabling the latching to take place and providing the minimal movement necessary (by a fresh push) to switch over the latching device 13LD into a release state.

FIG. 13F shows the partial release state wherein the push arm 13PA, the latching device 13LD and the micro switch pole 13M are partially released, enabling a fresh push of the key (or actuation by the armature 13AR) to release the latching device and reverse the switch state to a released state as shown in FIG. 13G which is the same state shown in FIG. 13D.

The above clearly show that a push throughout the flat key surface will reverse the state of the hybrid switch be it from on to off, from straight to cross and/or from engaging A contact to engaging B contact (SPDT or DPDT).

FIGS. 14A-14G show the use of flat keys to actuate rocker or toggle switches, similar to the push switches shown in FIGS. 12A-13G FIG. 14A shows the base key 120 that is similar to the base key 12 of FIG. 12A with the exception of the push bars 120A positions and the spring 120SP that is shaped for actuating two tactile actions 120SPL and 120SPR, one via the left L half and the other via the right R half of the spring 120SP.

Each of the tactile action is forced onto an hinged push seesaw or rotating bars of a fulcrum 130F supported by a switch case 140 of a rocker or toggle switches shown in FIGS. 14D and 14E respectively. The terms "rocker" and "toggle" generally describe the key used for operating the switch and not to the contacts and/or the pole of a switch. Therefore the terms rocker and/or toggle as disclosed are not to imply the switch internal structure in any specifics, they are to show two types of power switches that are commonly used for switching on-off lights in premises.

The pole of the commonly used rocker or toggle electrical switches cannot be "parked" in any other position outside the two positions shown in FIGS. 14D and 14E. The shown center position (in between) of FIGS. 14A and 14B is a transitional state for a short time of milli/micro second. The shown state in FIGS. 14A and 14B are therefore a transitional position of the seesaw 130F when the base key 120 shown is pushed at its center area in FIG. 14B and will be forced by the spring 130S or 131S to the left or right when released as shown in FIG. 14C.

The seesaw bars rotating toward left 130L or right 130R will follow the tilting position of the actuating spring 130S of FIG. 14D or 131S of FIG. 14E. Accordingly the shown finger push in FIG. 14B wherein the push is applied through the center area of the key, shown as area 1C in FIG. 14F, will actuate the tactile action of both spring portions 120SPL and 120SPR and will prevent the seesaw from rotating, such that the "present" (at the time when a center push is applied) spring 130S or 131S tilt will remain for the length of time of the push, and will return to its prior tilting position, or switch over if the spring 130 or 131 were made to tilt the other way.

Only a push by a finger to the left or right as shown in FIGS. 14D and 14E will switch over the spring 130S or 131S and the pole from engaging contact A to engaging contact B or from contact B to contact A.

Accordingly, the spring 120SP and the push bars 120A positioning, combined with the novel rotating pedestal clearly show that a toggle or a rocker switch can be operated by a flat decorative key by pushing one of the two opposite end areas of the key surface about the shown indicators 1-IN-1 and 1-IN-2 shown within a meshed lines.

The problem raised by such limitation is the issue of which surface of the key 1SG or 1SPL is to be pushed for reversing the switch state. This mandates an indication directing the user to the proper pushing position to prevent a situation where the pushing of the key wrongly will result in no switching action.

Such indications are provided by the dual LED 3A and 3B installed in the intelligent support box. The U.S. Pat. No. 9,218,358 discloses an indicator(s) for identifying the statuses of the installed hybrid or manual switches. Two or more indicators shown as 3A or 3B with their surfaces are positioned at the inner top cover of the support box, directed to a light access at the base of the switch, hybrid or manual or a relay and combinations thereof.

The light access at the base of the installed hybrid or manual switch is emitted via a lightguide 3ALG and 3BLQ also known as Plastic Optical Fiber (POF) extended from the access at the switch bottom all the way and through an indicators 3ALG and 3BLG at the top surface of the switch body 140T shown in FIG. 14G.

The disclosed above indicators for the hybrid switches are for a single indicator while the shown keys of the manual switches including the glass key 1SGD and the plastic key 1SPLD are disclosed with dual indicators. This is to provide indications to the position or surface in which the finger push for reversing the toggle or rocker switch state is indicated.

Though the present invention does not include full explanation of the intelligent support box and the electronic control circuit used in the intelligent box, it is preferable to disclose a modified circuit of the intelligent box that includes dual illuminator (LEDs) for each installed toggle or rocker switch. The modified circuit of the intelligent support box is disclosed in FIG. 17 and it will be explained further below.

Shown in FIGS. 15A-15D are the attachments of the decorative panels or frames onto the frames 31, 61 and 81 which though not shown to cover all the illustrated support box sizes applies to all of the intelligent boxes and sizes with both the plastic decorative frames 3FPL for the three gang boxes including 30A~D of FIGS. 15A-15B, the 6FGB which is shown to be the glass frame base for the shown six gang intelligent box 60A-D of FIG. 15C and the molded plastic decorative frame 8FPL for the eight gang intelligent box 80A-D of FIG. 15D, including other sizes such as 4 gang, 10 gang or 14 gang in horizontal or vertical orientations, as the case may be, all are intended to be well covered in the details disclosed above and herein.

As shown in all the drawings of FIGS. 15A-15D the elements to attach the decorative plastic or the glass frame, are the serrated studs 33A-(1-8 or n) that are mated with a reciprocal receptacle divided into two receptacle types.

The frame receptacles included in all the intelligent or non intelligent support boxes are the four receptacles 33 (1-4). The added receptacles 34 (5~8 or n) of which two 34-5 and 34-6 are shown in FIG. 15C and further shown as four receptacles 34-5~34-8 and 34-n in FIG. 15-C at the end of the locking arm 34 for locking into place. The serrated studs shown in FIGS. 15C and 15D are the studs 33A-5 to 33A-8 or 33A-n.

FIG. 15D shows details of the serrated stud 33A-7 of the plastic decorative frame 8FPL inserted into the space between the box inner frame 81A and the locking arm 34 provided with locking convex 34A. The serrated stud 33A-7 is provided with plurality of convexes 33b such that the plurality of convexes 33b can be slided and locked into position which is the physical touch with the wall surrounding the frame 81 shown in FIG. 15C with the locking convex 34A rests or parks between two convexed 33B and thereby effectively locking the decorative cover frame into position of touching the surrounding wall surface.

The dual use of the locking arm 34 designed for locking the individual hybrid or manual switch and for simultaneously locking the power outlets and the switches to the box as they are inserted into the box, and wherein the locking the decorative frames onto the box frame and onto the wall transforms a simple locking arms 34 into a multi locking arms, wherein the serrated stud of the decorative cover become an added element to forcefully latch the locking bar 34 onto the locked switch or outlet and the locking of the decorative frame onto the wall—by simple and convenient hand push of the decorative frame all the way to the wall (5-8 mm distance).

The same applies (when the need arise) to remove a switch or an outlet, a simple pull back of the decorative cover releases the latching condition and the access to release the locking arm and pull out the switch or outlet as the need arise, effortlessly.

The shown serrated studs 33A(5-8) are limited to few studs only, but if the need arise it is equally possible to provide n reciprocal studs to each and all of the locking arm of a given support box.

FIGS. 16A-16D show a cut view of the assembly of the elements of the present invention as combined into decorative panels including flat cut glass panels and molded flat or curved keys assembled into a flat or curved edged panels for mounting onto intelligent or non intelligent support wall boxes.

Figure 16A:
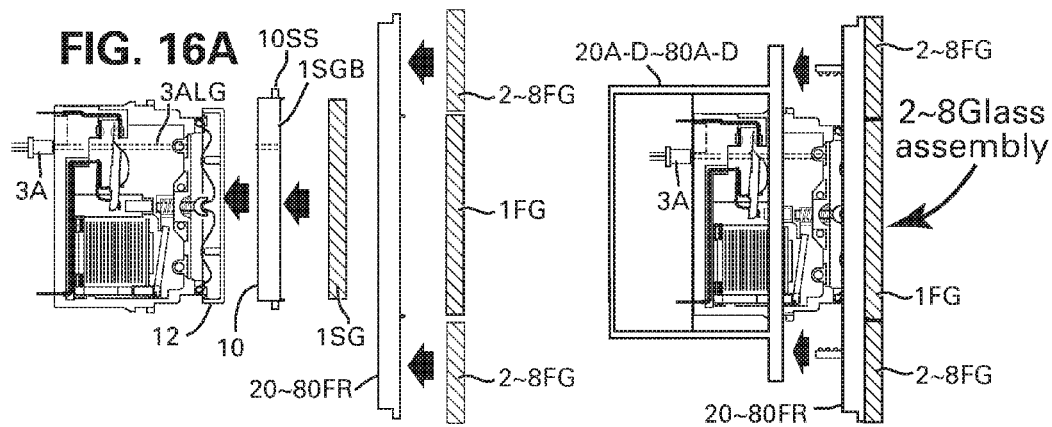
FIG. 16A-16D show a side view of the glass and plastic molded keys for attachment to the base key and the decorative covers, having identical thicknesses and attaching process, thereby enabling a self replacement of keys and covers by the users.

FIG. 16A shows the element of the cut glass panel comprising a glass key holder 10 having a convex 10L shown in FIGS. 12E-12F to lock onto the concave 12CU of the key base 12 of FIG. 12E-12F and a stopper loss designed to stop the key movement to ensure the "parking" of the key to be flat with the panel surface, the glass key 1SG a molded glass panel base 20-80FR, of the shown dual gang and up to eight gang as shown, or any other expanded frame size for horizontal, vertical and combinations panels, square or rectangular including the panel shown in FIGS. 2A-2C, 3A-4B, 5A-5B, 6A, 7A-7B, 8A-8B and 9.

As discussed above the base key 12, the glass key holder 10 and the glass key 1SG are provided with passage for one or plurality of indicators light via at least one LED 1-IN accessed from the intelligent support box and optically linked via the lightguide 3ALG disclosed above and shown in FIGS. 16A-16D.

Figure 16B:
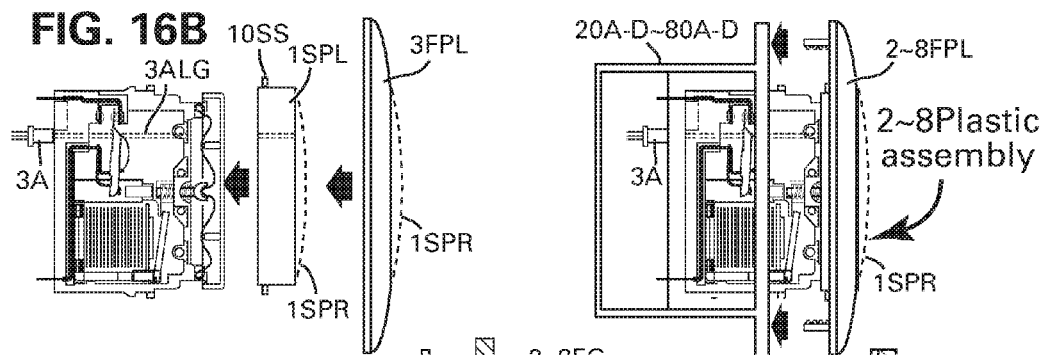

FIG. 16B shows the elements of the molded (plastic material) that can be provided by an exact design and structure as the glass, such as using transparent polycarbonate or acryl materials and/or a combination of decorative rounded edges of the frames 2-8EPL and other future sizes disclosed above and/or with rounded keys 1SPR shown in dotted line for providing all rounded surfaces, if rounded is or will be the architect's preference.

The molded keys 1SPL or the optional rounded key 1SPR and the glass key holder 10 include a key stoppers loss for stopping the keys through the opening accesses 20-OA~80-OA of the inner frames, such that when the key is released from the finger touch the key front will be perfectly aligned with the flat or the rounded decorative cover surfaces. The molded keys 1SPL and 1SPR also include the convex 10C for locking the molded keys onto the key base 12.

The cost of the molded frames and keys are lower than those of the glass panels, and it would be within budgeted prices, having identical function and similar look as the glass keys and panels, providing the "refined taste" of premises offered to budgeted minds and limits.

Otherwise, the mounting elements such as the studs 33A and the receptacles 33 and locking arms 34 discussed above are included in the elements of assembling the switches, the keys, the AC outlets and the decorative panels or frames are all included and form a given function in the assembling and the process of assembling.

Figure 16C:
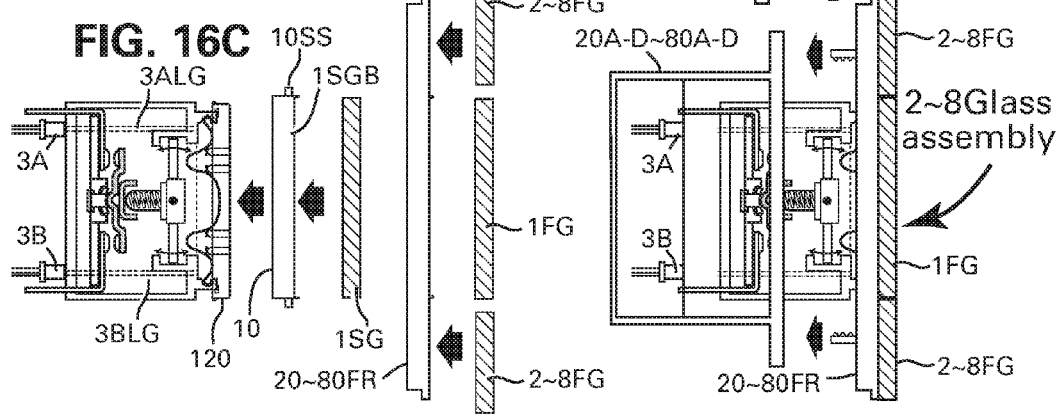
Figure 16D:
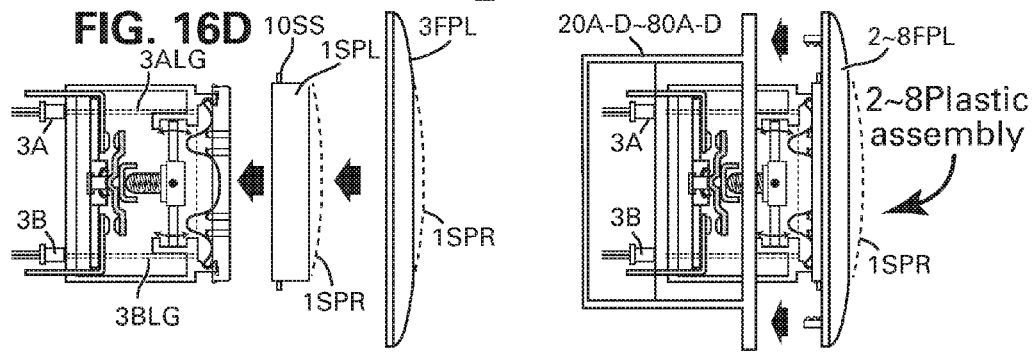

FIGS. 16C and 16D show identical frames or panels and keys to those shown in FIGS. 16A-16B, with the exception of the keys for operating the disclosed above toggle or rocker switches requiring dual indicators to identify the push position, disclosed above.

FIG. 17 shows a block diagram of the amended intelligent support box disclosed in U.S. Pat. No. 9,219,358 to include n indicators 3LG-2 for the manually actuated rocker and toggle switches requiring the indicator 3LG-2 to indicate along with 3LG-1 the one of the two surfaces at the opposing ends of the key 1SGD or 1SPLD about the indicators 1-IN-1 and 1-IN-2 shown in meshed surfaces.

The block diagram (FIG. 12) of the support box of the U.S. Pat. No. 9,219,358 discloses n indicators KL-1~KL-n that are equivalent to the indicators 3LG-1 of the present invention, but does not disclose the indicators 3LG-2 and their drivers.

The intelligent wall box discloses in the U.S. Pat. No. 9,219,358 detects the current drawn or is drained via each hybrid or manual switch be it SPDT, SPDT, DPST or DPDT reversing switch. Moreover, the intelligent box discloses the sensing and identifying each connected terminal and its load statuses and further identifies the one terminal of dual traveler lines (of SPDT and DPDT switches) connected to a load.

The above sensing facility combined with the structured and programmed terminals for each manual switch plugged into the support box provide all the data needed to identify the exact status of each switch and the status of the load connected to the switch and accordingly control the prior incorporated indicators KL-1~KL-n to be the indicators 3ALG and further drive the needed "n" indicators 3BLG of the present invention.

It should be obvious from all the above that the decorative panels and keys attached to the intelligent or non intelligent support boxes of the present invention are novel and innovative and never experienced in the electric wiring field. The new combinations of switches, keys and panels offer a new horizon for providing esthetically attractive look for managing and controlling the electric power that was awaiting in limbo for a revisit of the present day's electrical panels and keys cost and the architectural structure and esthetics that cannot be ignored.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the scope of the invention.

What is claimed is:

1. A molded flat frame with one of right angled square and rectangle opening access sized to accommodate from one of an outlet and a key to one of plurality of outlets and one of plurality of keys and combinations of at least one outlet and at least one key, said flat frame is one of a decorative molded frame and a molded base frame with plurality of bonding spaces for bonding plurality of one of molded and cut right angled rectangular decorative inserts in given sizes fit for said spaces and said keys;

said decorative inserts are cut from one of a decorative crystal sheet and one of a glass sheet and molded from a transparent plastic material and are one of tinted and clear with a rear surface of each of said decorative inserts is at least one of imprinted and color coated for bonding onto said surfaces and onto a glass key holder, said key is one of a molded push key and said glass key holder attached to a key base for operating one of said hybrid and manual switch by a push of a finger;

said outlet and said switch are attached to one of support box and intelligent support box structured to include a box frame and receptacles for self locking serrated studs molded on rear surfaces of said molded frame and said base frame for attaching one of a combination of at least one of said molded push key with said decorative molded frame and at least one bonded said base key with a bonded said base frame by hand push to provide flat surface throughout the attached assembly mounted onto one of a flat surface and a wall.

2. The molded flat frame according to claim 1, wherein the width of said inserts, the flat frame bonding spaces, the key bonding space and the key inserts are identical.

3. The molded flat frame according to claim 1, wherein the length of the left insert, the left bonding space, the right insert, the right bonding space, the key bonding space and the key insert are identical.

4. The molded flat frame according to claim 1 wherein the width of the left insert, the left bonding space, the right insert and the right bonding space differs from the width of the key bonding space and the key insert.

5. The molded flat frame according to claim 1 wherein the thickness of said decorative frame including said molded key and said molded base frame including said glass key bonded with said inserts is identical, and wherein the decorative frame and the base frame are interchangeable by pulling the mounted frame, unlocking the serrated studs from said receptacles and removing the key from the base key of the at least one mounted switch and re-attaching a replacement key onto said mounted switch and a replacement frame by fresh hand push.

6. The molded flat frame according to claim 1 wherein said receptacles including at least one receptacle incorporated into a locking arm for locking at least one of said outlet and said switch and wherein the insertion of a reciprocal serrated locking stud firmly locks and latches said at least one outlet and switch by the further pressure introduced by the inserted serrated locking stud between said support box body and said locking arm.

7. The molded flat frame according to claim 1 wherein a convex on each end of said base key limits the up-down movements of the base key mounted on the top of the hybrid switch structured to support a pair of structurally circled hinges on each end of a tactile spring by reciprocal two pair of semi circled cutouts for enabling friction and tension free up-down tactile movements and operating the switch by push rods of said key base onto the tactile spring actuated by a finger push throughout the accessible key surface.

8. The molded flat frame according to claim 1 wherein a convex on each end of said base key limits the up-down movements of the base key mounted on the top of the hybrid switch structured to support a pair of structurally circled hinges on each end of a dual tactile spring by reciprocal two pair of semi circled cutouts for enabling friction and tension free dual up-down tactile movements for operating one of a toggle and a rocker switch by push rods of said key base onto the dual tactile spring and onto a rotating seesaw bars of a fulcrum, each opposing tactile movement tilts the rotating seesaw bars to switch over the pole contact from a first contact to a second contact or no contact respectively by a finger push onto one indicated surface of the two opposing surface of said key.

9. The molded flat frame according to claim 8 wherein said one of a toggle and rocker switch is attached to an intelligent support box including dual indicators alternating said indicated opposing surfaces to indicate the statuses of a given load connected to said switch and said key active surface for said switch over, said intelligent support box is operated via a CPU and a memory on the basis the load and switching position data provided by sensing and status identifying sensors included in the intelligent support box for indicating the key active surface about one of the two indicators.

10. The molded flat frame according to claim 1 wherein a single insert sized to cover the entire base frame including the right angled square and rectangular opening access is used for attachment onto plurality of touch icons each identified by an indicator, a given space of a rear surface of said single insert covering said molded flat frame excluding the opening access space is one of printed and color coated for providing identical look alike appearance for the touch icons and the keys of said at least one switch;

said molded flat screen is attached to one of a support box incorporating the touch icons circuits via said serrated studs and onto a touch icons flat base attach to one of a wall box and directly on a wall via self locking convexes onto concaves included at the edges of the touch icons flat base.

11. A method for installing a molded flat frame with one of right angled square and rectangle opening access sized to accommodate from one of an outlet and a key to one of plurality of outlets and one of plurality of keys and combinations of at least one outlet and at least one key, said outlet and said switch are attached to one of support box and intelligent support box structured to include a box frame and receptacles for self locking serrated studs molded on rear surfaces of said molded frame and said base frame;

said flat frame is one of a decorative molded frame and a molded base frame with plurality of bonding spaces for bonding plurality of one of molded and cut right angled rectangular decorative inserts in given sizes fit for said spaces and said keys, said inserts are cut from one of a decorative crystal sheet and one of a glass sheet and molded from a transparent plastic material and are one of tinted and clear with a rear surface of each of said decorative inserts is at least one of imprinted and color coated for bonding onto said surfaces and onto a glass key holder;

said key is one of a molded push key and said glass key holder with bonded insert for operating one of said hybrid and manual switch by a push of a finger, said method comprising the steps of:

a. attaching at least one of said outlet and said switch to said support box;

b. attaching at least one of said molded key and said glass key holder with bonded insert to said at least one switch attached to said support box;

c. attaching a matching one of said decorative molded frame and said base frame bonded with inserts onto a frame of said support box including plurality of self locking serrated studs into the reciprocal receptacles included in said frame of said support box attached to a wall; and d. pushing the flat mounted decorative assembly onto said frame of said support box and onto the surrounding wall or surface.

12. The method according to claim 11, wherein the width of said inserts, the flat frame bonding spaces, the key bonding space and the key insert are identical.

13. The method according to claim 11 wherein the length of the left insert and bonding space, the right insert and bonding space, the key bonding space and the key insert are identical.

14. The method according to claim 11 wherein the width of the left insert, the left bonding space and the right insert and the right bonding space differs from the width of the key bonding space and the keys insert.

15. The method according to claim 11 wherein the thickness of said decorative frame including said molded key and said base frame including said base key bonded with said inserts is identical, and wherein the decorative frame and the base frame are interchangeable by pulling the mounted frame, unlocking the serrated studs from said receptacles surface and removing the key from the base key of the at least one mounted switch and re-attaching a replacement key onto said mounted switch and a replacement frame by a fresh hand push.

16. The method according to claim 11 wherein said receptacles including at least one receptacle incorporated into a locking arm for locking at least one of said outlet and said switch and wherein the insertion of a reciprocal serrated locking stud firmly locks and latches said at least one outlet and switch by the further pressure introduced by the inserted serrated locking stud between said support box body and said locking arm.

17. The method according to claim 11 wherein a convex on each end of said base key limits the up-down movements of the base key mounted on the hybrid switch top structured to support a pair of structurally circled hinges on each end of a tactile spring by reciprocal two pair of semi circled cutouts for enabling friction and tension free up-down tactile movements and operating the switch by push rods of said key base onto the tactile spring actuated by a finger push throughout the accessible key surface.

18. The method according to claim 11 wherein a convex on each end of said base key limits the up-down movements of the base key mounted on the top of the hybrid switch structured to support a pair of structurally circled hinges on each end of a dual tactile spring by reciprocal two pair of semi circled cutouts for enabling friction and tension free dual up-down tactile movements for operating one of a toggle and a rocker switch by push rods of said key base onto the dual tactile spring and onto a rotation seesaw bars of a fulcrum, each opposing tactile movement tilts the rotating seesaw bars to switch over the pole contact from a first contact to a second contact or no contact respectively by a finger push onto one indicate surface of the two opposing surface of said key.

19. The method according to claim 18 wherein said one of a toggle and rocker switch is attached to an intelligent support box including dual indicators alternating said indicated opposing surfaces to indicate the statuses of a given load connected to said switch and said switch active surface for said switch over, said intelligent support box is operated via a CPU and a memory on the basis the load and switching position data provided by sensing and status identifying sensors included in the intelligent support box for indicating the active surface about one of the two indicators.

20. The method according to claim 11 wherein a single insert sized to cover the entire base frame including the right angled square and rectangular opening access is used for attachment onto plurality of touch icons each identified by an indicator, a given space of a rear surface of said single insert covering said molded flat frame excluding the opening access space is one of printed and color coated for providing identical look alike appearance for the touch icons and the keys of said at least one switch;

said molded flat screen is attached to one of a support box incorporating the touch icons circuits via said serrated studs and onto a touch icons flat base attach to one of a wall box and directly on a wall via self locking convexes onto concaves included at the edges of the touch icons flat base.

* * * * *